(12) United States Patent
Senoo

(10) Patent No.: US 10,542,858 B2
(45) Date of Patent: Jan. 28, 2020

(54) SELF-PROPELLED ELECTRONIC DEVICE AND TRAVEL METHOD FOR SELF-PROPELLED ELECTRONIC DEVICE

(71) Applicant: SHARP KABUSHIKI KAISHA, Sakai, Osaka (JP)

(72) Inventor: Toshihiro Senoo, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 164 days.

(21) Appl. No.: 15/750,582

(22) PCT Filed: Aug. 2, 2016

(86) PCT No.: PCT/JP2016/072674
§ 371 (c)(1),
(2) Date: Feb. 6, 2018

(87) PCT Pub. No.: WO2017/085967
PCT Pub. Date: May 26, 2017

(65) Prior Publication Data
US 2019/0008347 A1    Jan. 10, 2019

(30) Foreign Application Priority Data
Nov. 16, 2015   (JP) ................................. 2015-223879

(51) Int. Cl.
*G05D 1/00* (2006.01)
*A47L 9/28* (2006.01)
*G05D 1/02* (2006.01)

(52) U.S. Cl.
CPC .......... *A47L 9/2805* (2013.01); *A47L 9/2894* (2013.01); *G05D 1/0088* (2013.01);
(Continued)

(58) Field of Classification Search
CPC .. A47L 9/2805; A47L 9/2894; A47L 2201/04; A47L 9/2842; A47L 9/2857;
(Continued)

(56) References Cited

U.S. PATENT DOCUMENTS

2004/0181896 A1* 9/2004 Egawa ................. G05D 1/0219
15/319
2006/0217844 A1* 9/2006 Saeki ....................... A47L 9/009
700/258

FOREIGN PATENT DOCUMENTS

JP        62-154008 A    7/1987
JP        H05-207955 A   8/1993
(Continued)

*Primary Examiner* — Robert J Scruggs
(74) *Attorney, Agent, or Firm* — ScienBiziP, P.C.

(57) ABSTRACT

A self-propelled electronic device comprising a housing: when an obstacle is detected ahead while the housing is moving straight forward along a outbound or a return path while it travels in a zigzag manner in a closed region, the housing travels along the obstacle such that the obstacle is located on a predetermined side of the housing, and when the housing advances by a predetermined pitch width in a direction orthogonal to a back-and-forth direction during traveling along the obstacle, the housing changes its direction and moves straight forward along a next return path or outbound path, whereas, when the housing again returns to the outbound path or return path along which it has traveled before, during traveling along the obstacle, wherein if its orientation is reversed based on its orientation when the housing has traveled along the outbound path or the return path, the housing ends traveling.

5 Claims, 35 Drawing Sheets

(52) U.S. Cl.
 CPC ......... *G05D 1/0238* (2013.01); *G05D 1/0274* (2013.01); *A47L 2201/04* (2013.01)

(58) Field of Classification Search
 CPC ...... A47L 2201/00; A47L 9/2889; A47L 9/28; G05D 1/0088; G05D 1/0238; G05D 1/0274; G05D 1/0219; G05D 1/0255; G06F 19/00
 See application file for complete search history.

(56) References Cited

FOREIGN PATENT DOCUMENTS

| | | |
|---|---|---|
| JP | 2003-241835 A | 8/2003 |
| JP | 2004-049594 A | 2/2004 |
| JP | 2006-268498 A | 10/2006 |

\* cited by examiner

SELF-PROPELLED ELECTRONIC DEVICE AND TRAVEL METHOD FOR SELF-PROPELLED ELECTRONIC DEVICE

BACKGROUND OF THE INVENTION

1. Field of the Invention

The present invention relates to a self-propelled electronic device and a travel method for a self-propelled electronic device, and more particularly to a self-propelled electronic device having a function of avoiding an obstacle, and a travel method for the self-propelled electronic device.

2. Description of the Background Art

Conventionally, there have been known self-propelled electronic devices that perform a job such as cleaning, while autonomously traveling in an indoor space or an outdoor space. Some of such devices have a function of cleaning everywhere in a room by traveling in a regular zigzag manner.

As such a self-propelled electronic device that travels in a zigzag manner, an invention of an autonomous vacuum cleaner has been disclosed which travels around a room in a zigzag manner by repeating rectilinear travel and 90-degree turn (for example, see Patent Documents 1 and 2).

CITATION LIST

Patent Documents

Patent Document 1: Japanese Unexamined Patent Publication No. 2006-268498
Patent Document 2: Japanese Unexamined Patent Publication No. H05-207955

However, if there is an obstacle in a room, an area where the self-propelled electronic device has not yet traveled is left by merely traveling around the room in a zigzag manner. For example, when there is an obstacle BL1 in the room, the self-propelled electronic device travels around an area between a sidewall SW and the obstacle BL1 in a zigzag manner as indicated by routes RT3 to RT5 in FIG. 6, because the self-propelled electronic device cannot distinguish between the sidewall SW and the obstacle BL1.

As a result, an untraveled area UTA1 (a hatched portion enclosed by a dash-dot line in FIG. 6) where the self-propelled electronic device has not traveled is generated.

SUMMARY OF THE INVENTION

The present invention is accomplished in view of the above-mentioned circumstance, and aims to provide a self-propelled electronic device that can clean everywhere in a room, even when there is an obstacle in the room, while avoiding the obstacle, and a travel method for said self-propelled electronic device.

The present invention provides a self-propelled electronic device comprising: a housing; drive wheels that enable the housing to travel; a travel control unit that controls travel of the housing; an obstacle sensor that detects an obstacle present at least in front of, on a left side, and on a right side of the housing; and a housing direction detection unit that detects an orientation of the housing, wherein: when the housing travels in a closed region surrounded by an obstacle, the travel control unit causes the housing to travel back and forth along a route formed such that an outbound path and a return path which are linear are alternately connected; when the obstacle sensor detects an obstacle ahead while the housing is moving straight forward along the outbound path, the travel control unit causes the housing to travel along the obstacle such that the obstacle is located on a predetermined side of the housing, which is either a left side or a right side of the housing, whereas, when the obstacle sensor detects an obstacle ahead while the housing is moving straight forward along the return path, the travel control unit causes the housing to travel along the obstacle such that the obstacle is located on an opposite side of the predetermined side; and when the housing advances by a predetermined pitch width in a direction orthogonal to a back-and-forth direction during traveling along the obstacle, the travel control unit changes a direction of the housing and causes the housing to move straight forward along a next return path or outbound path, whereas, when the housing again returns to the outbound path or return path along which the housing has traveled before the detection of the obstacle during traveling along the obstacle, the housing direction detection unit detects whether an orientation of the housing is reversed or not based on an orientation of the housing when the housing has traveled along the outbound path or the return path before the detection of the obstacle, wherein, when the orientation of the housing is reversed, the travel control unit ends traveling of the housing, and when the orientation of the housing is not reversed, the travel control unit causes the housing to continue to move straight forward along the outbound path or the return path.

The present invention also provides a travel method for a self-propelled electronic device wherein: when a housing provided with drive wheels travels in a closed region surrounded by an obstacle, the housing travels back and forth along a route formed such that an outbound path and a return path which are linear are alternately connected; when an obstacle is detected ahead while the housing is moving straight forward along the outbound path, the housing travels along the obstacle such that the obstacle is located on a predetermined side of the housing, which is either a left side or a right side of the housing, whereas, when an obstacle is detected ahead while the housing is moving straight forward along the return path, the housing travels along the obstacle such that the obstacle is located on an opposite side of the predetermined side; and when the housing advances by a predetermined pitch width in a direction orthogonal to a back-and-forth direction of the housing during traveling along the obstacle, the housing changes its direction and moves straight forward along a next outbound path or return path, whereas, when the housing again returns to the outbound path or return path along which the housing has traveled before the detection of the obstacle during traveling along the obstacle, whether an orientation of the housing is reversed or not is determined based on an orientation of the housing when the housing has traveled along the outbound path or the return path before the detection of the obstacle, wherein, when the orientation of the housing is reversed, traveling of the housing is ended, and when the orientation of the housing is not reversed, the housing keeps on moving straight forward along the outbound path or the return path.

The present invention can implement a self-propelled electronic device that can clean everywhere in a room, even when there is an obstacle in the room, while avoiding the obstacle, and a travel method for said self-propelled electronic device.

DETAILED DESCRIPTION

First Embodiment

Hereinafter, the present invention will be described in more detail with reference to the drawings. It is to be noted that the description below is illustrative in all respects, and should not be construed to limit the present invention.

In the first embodiment, a self-propelled vacuum cleaner 1 will be described as one example of the self-propelled electronic device. However, the present invention is applicable to self-propelled electronic devices (for example, a self-propelled ion generator) other than a vacuum cleaner.

Figure 1:
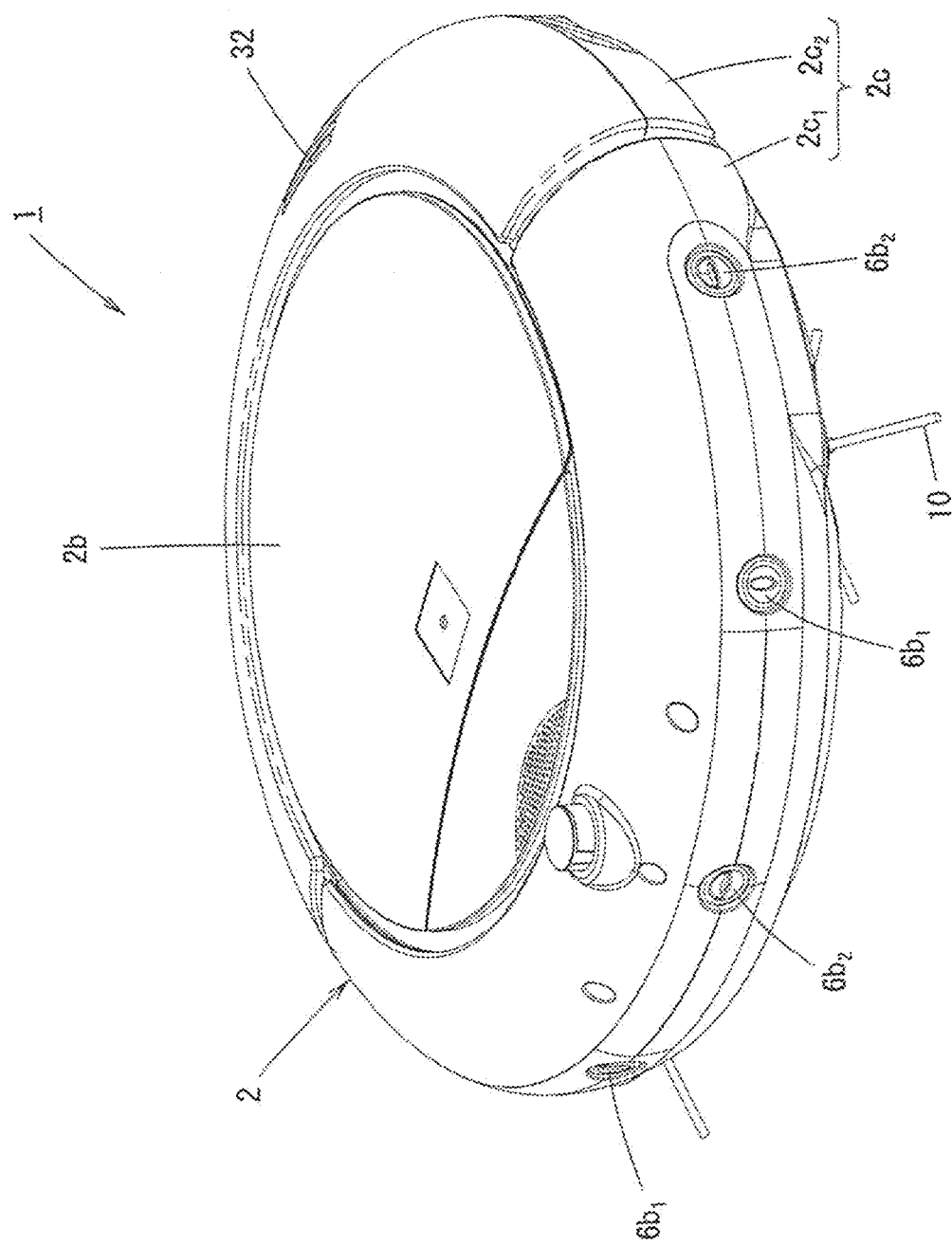
FIG. 1 is a perspective view showing a self-propelled vacuum cleaner according to a first embodiment of the present invention.
Figure 2:
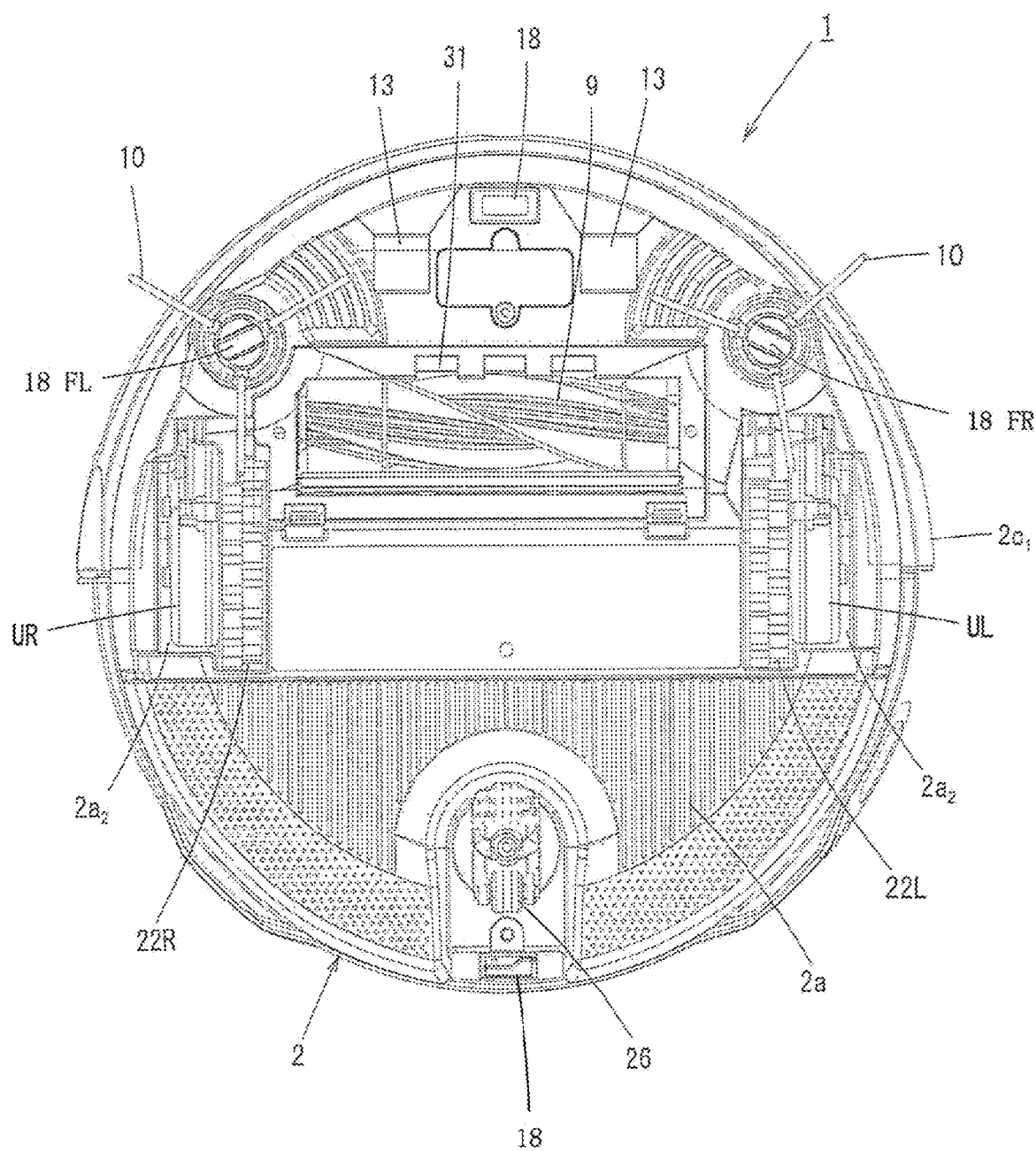
FIG. 2 is a bottom view of the self-propelled vacuum cleaner shown in FIG. 1.
Figure 3:
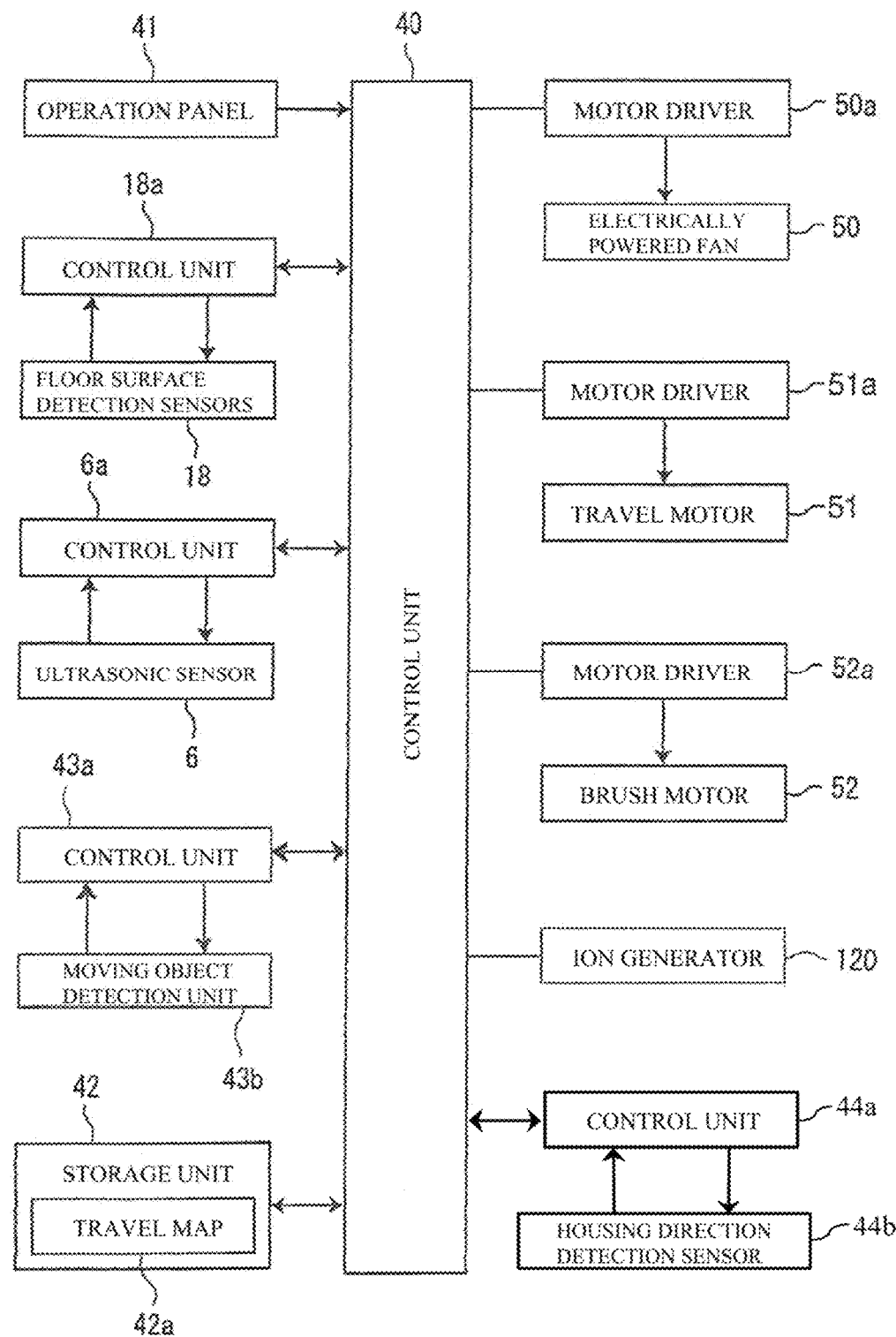
FIG. 3 is a block diagram showing a schematic configuration of a control circuit of the self-propelled vacuum cleaner shown in FIG. 1.
Figure 4:
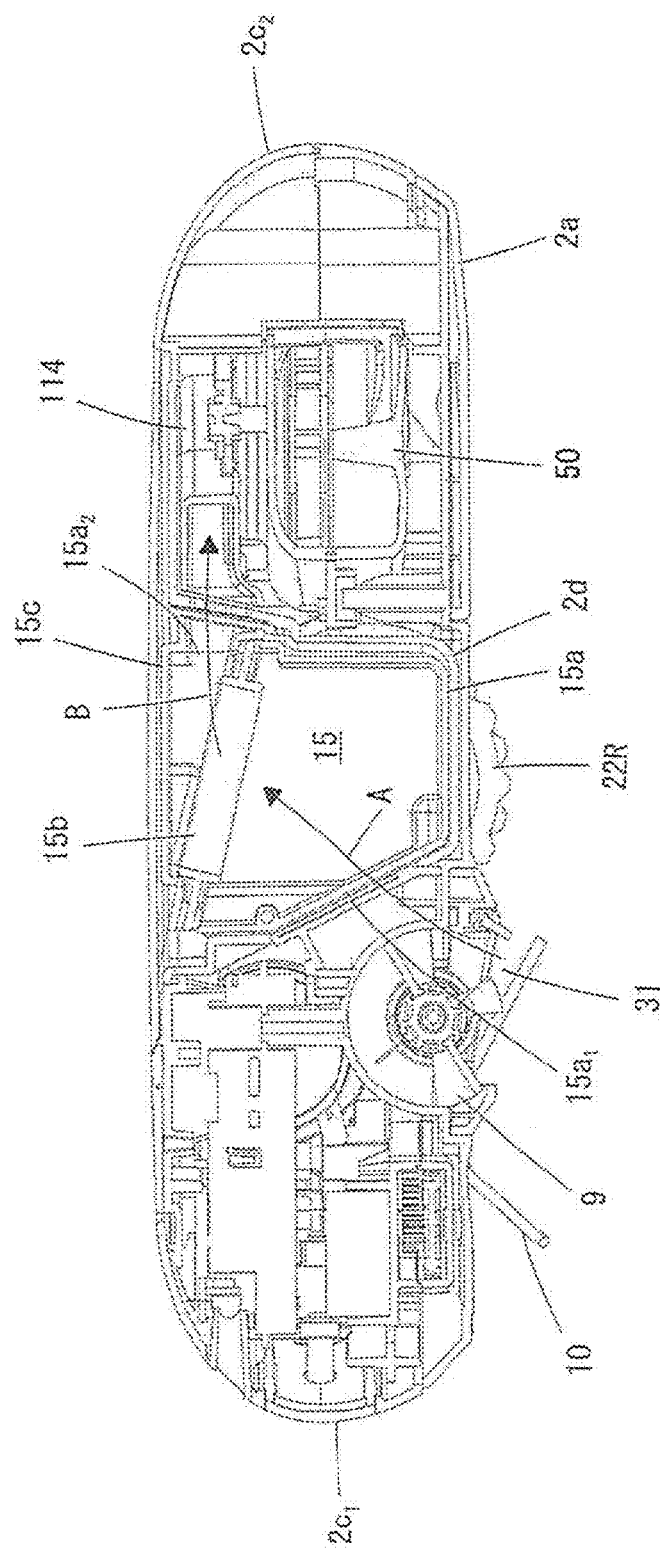
FIG. 4 is a sectional side view of the self-propelled vacuum cleaner shown in FIG. 1.
Figure 5:
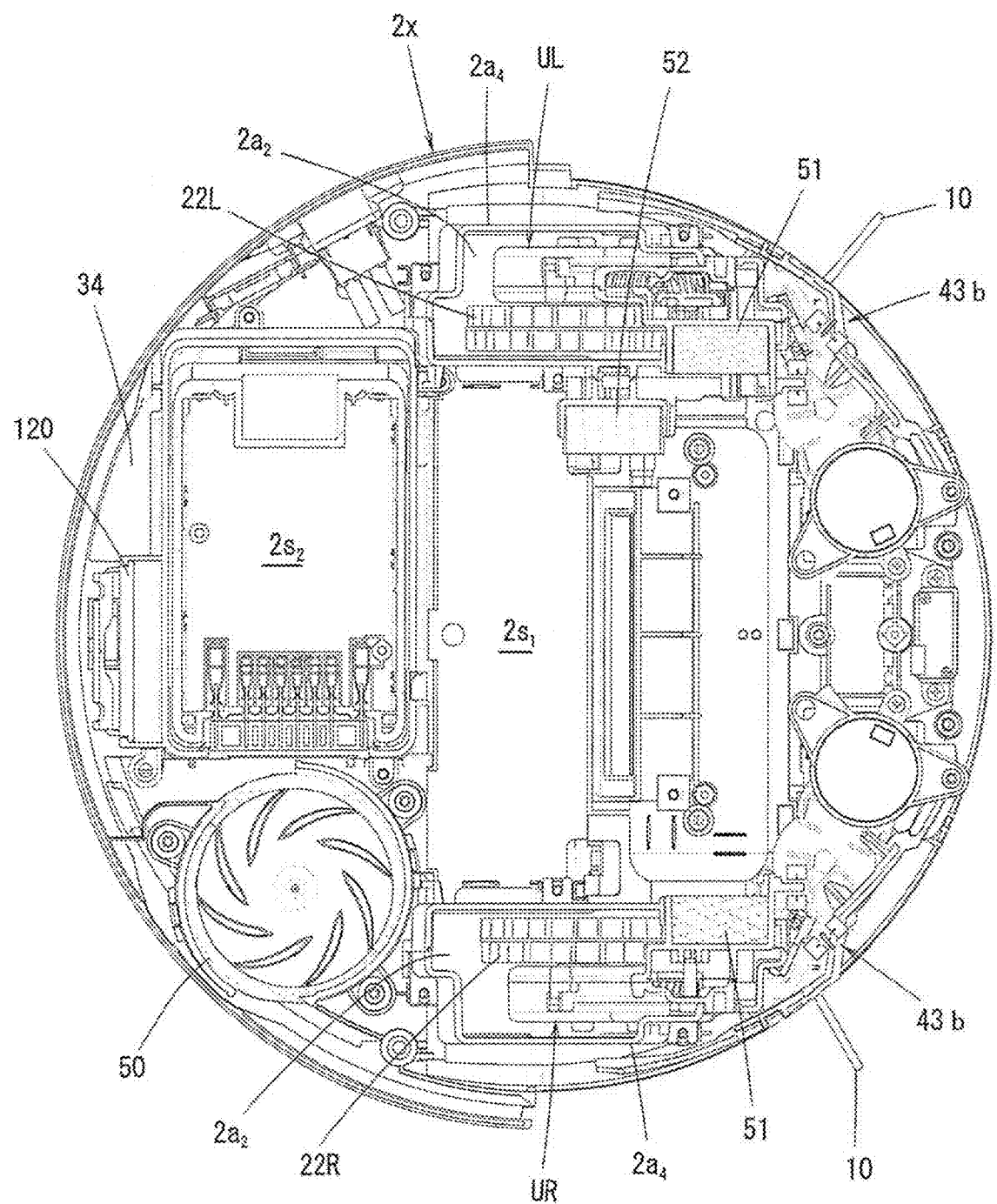
FIG. 5 is a sectional plan view of the self-propelled vacuum cleaner shown in FIG. 1.
Figure 6:
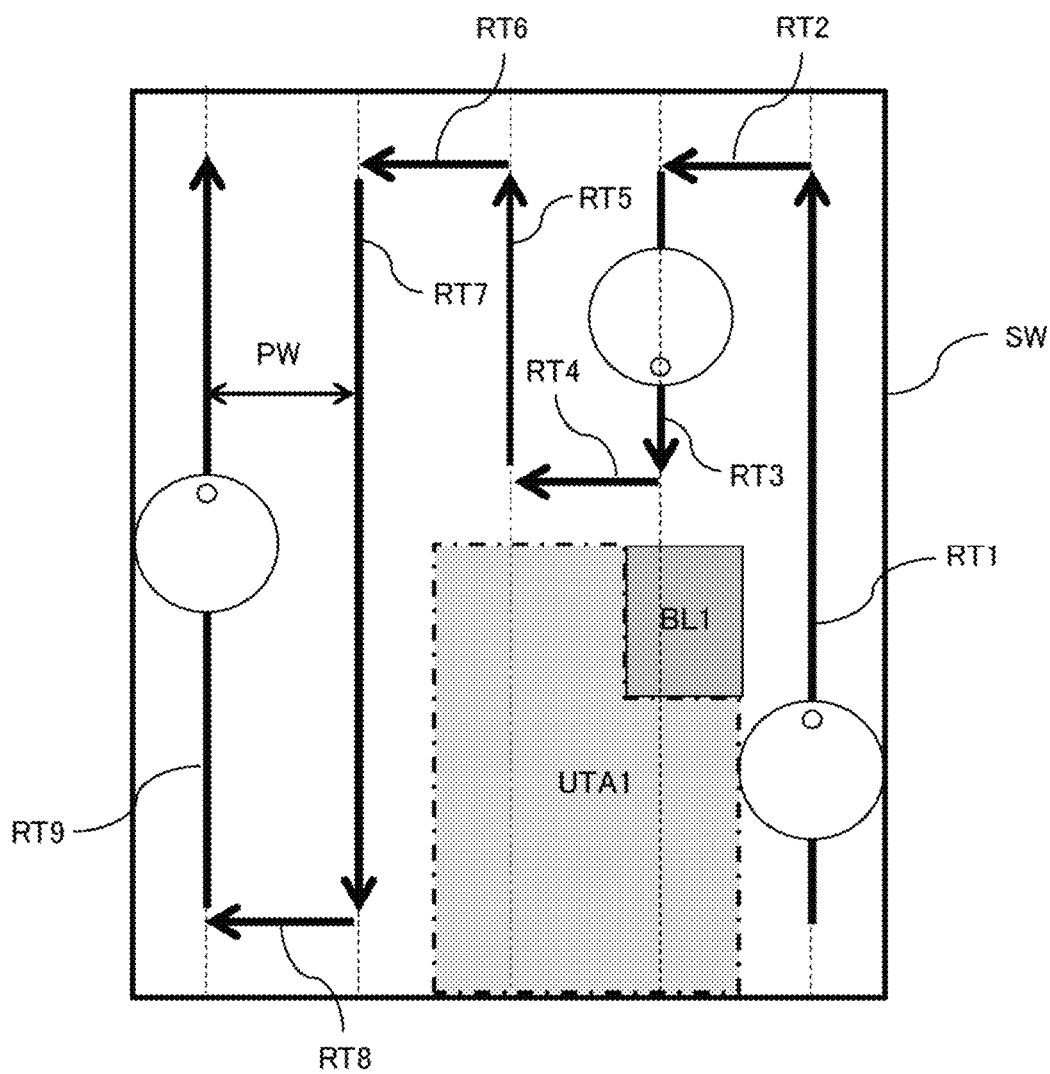
FIG. 6 is an explanatory view showing one example of a travel operation of a conventional self-propelled vacuum cleaner.

FIG. 1 is a perspective view of the self-propelled vacuum cleaner 1 according to the first embodiment of the present invention. FIG. 2 is a bottom view of the self-propelled vacuum cleaner 1 shown in FIG. 1. FIG. 3 is a block diagram showing a schematic configuration of a control circuit of the self-propelled vacuum cleaner 1 shown in FIG. 1. FIG. 4 is a sectional side view of the self-propelled vacuum cleaner 1 shown in FIG. 1. FIG. 5 is a sectional plan view of the self-propelled vacuum cleaner 1 shown in FIG. 1.

The self-propelled vacuum cleaner 1 according to the first embodiment has a disc-shaped housing 2, and includes, inside and outside of the housing 2, components such as a collision detection unit 43, a rotary brush 9, side brushes 10, a dust-collecting box 15a composing a dust-collecting chamber 15, an electrically powered fan 50, a pair of left and right drive wheels 22L and 22R that enables the housing 2 to linearly move forward or backward and to turn in the clockwise direction or in the counterclockwise direction, a rear wheel 26, a pair of left and right charging terminals 13, a control section 40 including a plurality of floor surface detection sensors 18, 18FL, and 18FR, electronic device components, and the like, and a battery serving as a drive source for driving the drive wheels 22L and 22R, the rotary brush 9, the side brushes 10, the electrically powered fan 50, and the like.

A "drive wheel" in the present invention is implemented by the left drive wheel 22L and the right drive wheel 22R. A "travel control unit" in the present invention is implemented by cooperation between the control section 40 and a motor driver 51a. An "obstacle sensor" in the present invention is implemented by an ultrasonic sensor 6 or moving object detection unit 43b. A "housing direction detection unit" in the present invention is implemented by a housing direction detection sensor 44b.

In the self-propelled vacuum cleaner 1, the part where the rear wheel 26 is mounted is a rear part, a part opposite to the rear wheel 26 is a front part, and a part where the pair of left and right drive wheels 22L and 22R is mounted is an intermediate part. When the self-propelled vacuum cleaner 1 is stopped or is traveling on a horizontal surface, the housing 2 is supported by three wheels which are the pair of left and right drive wheels 22L and 22R and the rear wheel 26. Therefore, in the present specification, a direction of forward movement (frontward) indicates a direction in which the self-propelled vacuum cleaner 1 moves to the front side, a direction of backward movement (rearward) indicates a direction in which the self-propelled vacuum cleaner 1 moves to the rear side, left and right sides indicate a left side and a right side when the self-propelled vacuum cleaner 1 moves forward, and top and bottom sides indicate a top side and a bottom side in a state where the housing 2 is supported by three wheels on a floor surface.

The housing 2 has a bottom plate 2a which is circular in a plan view and is provided with a suction opening 31 formed on the front part at a position near the boundary between the front part and the intermediate part, a top plate 2b having a lid which is opened and closed for loading and unloading the dust-collecting box 15a to and from the housing 2, a side plate 2c which is annular in a plan view and formed along the outer peripheries of the bottom plate 2a and the top plate 2b, and a support plate 2d for supporting the dust-collecting box 15a.

The bottom plate 2a is formed with a pair of left and right openings $2a_2$ for storing a portion of each of the left and right drive wheels 22L and 22R in the housing 2. In addition, a support member $2a_4$ is provided around each of the openings $2a_2$ on the inner surface of the bottom plate 2a. Moreover, drive wheels 22L and 22R are respectively built in drive wheel units UL and UR provided with later-described travel motors 51 and drive force transmission mechanisms with gears for transmitting rotational drive force of the travel motors 51 to the respective drive wheels 22L and 22R. The drive wheel units UL and UR are pivotally supported by the support members $2a_4$ through a horizontal axis.

The side plate 2c is configured to be divided into two, a front bumper $2c_1$ and a rear side plate $2c_2$. The rear side plate $2c_2$ is formed with an exhaust opening 32. Hereinafter, the part of the housing 2 except for the bumper $2c_1$ is referred to as a housing main body $2x$.

Inside the housing 2, components such as the travel motors 51, a brush motor 52, the electrically powered fan 50, an ion generator 120, the dust-collecting box 15a, the control circuit, and the battery are provided. The center of gravity position of the housing 2 is placed on the rear part such that the housing 2 can be supported by three wheels which are the pair of left and right drive wheels 22L and 22R and the rear wheel 26. Note that, in FIG. 5, an intermediate space $2s_1$ in the housing 2 is for storing the dust-collecting box 15a, and a rear space $2s_2$ is for storing the battery.

As shown in FIG. 3, the control circuit which performs an operation control for the entire self-propelled vacuum cleaner 1 includes the control section 40, an operation panel 41 allowing a user to input setting conditions or operation commands regarding the operation of the self-propelled vacuum cleaner 1, a storage unit 42 storing a travel map 42a, a motor driver 50a for driving the electrically powered fan 50, a motor driver 51a for driving the travel motors 51 for the drive wheels 22L and 22R, a motor driver 52a for driving the brush motor 52 that drives the rotary brush 9 and the side brushes 10, a control unit 18a that controls the floor surface detection sensors 18, a control unit 6a that controls a later-described ultrasonic sensor 6, a control unit 43a that controls the moving object detection units 43b which will be described later, a control unit 44a that controls the housing direction detection sensor 44b which will be described later, and the like.

The control section 40 is provided with a microcomputer including a CPU, a ROM, and a RAM, and transmits a control signal individually to the motor drivers 50a, 51a, and 52a on the basis of program data stored in advance in the storage unit 42 to perform a drive control of the electrically powered fan 50, the travel motors 51, and the brush motor 52, thereby performing a sequence of cleaning operations. The program data includes program data for a normal mode for cleaning a wide region on the floor surface and program data for a wall mode for cleaning along a wall.

In addition, the control section 40 receives a setting condition and an operation command inputted by the user through the operation panel 41, and causes the storage unit 42 to store the received result. The travel map 42a stored in the storage unit 42 is information regarding travel of the self-propelled vacuum cleaner 1, such as a travel route around the place where the self-propelled vacuum cleaner 1 is installed and a travel speed. The travel map 42a can be stored in the storage unit 42 in advance by the user or can be automatically recorded by the self-propelled vacuum cleaner 1 by oneself during the cleaning operation.

Further, when the self-propelled vacuum cleaner 1 detects an obstacle BL on the travel course by the ultrasonic sensor 6 or when the self-propelled vacuum cleaner 1 reaches the end of a region to be cleaned, the drive wheels 22L and 22R temporarily stop, and then, the left and right drive wheels 22L and 22R rotate in opposite directions to change the direction. Thus, the self-propelled vacuum cleaner 1 can autonomously travel and perform a cleaning operation around an entire place where it is installed or an entire desired range, while avoiding the obstacle BL.

When the obstacle BL is detected in the traveling direction by ultrasonic wave transmitting units $6b_1$ and ultrasonic wave receiving units $6b_2$ constituting the ultrasonic sensor 6 of the self-propelled vacuum cleaner 1, the detection signal is transmitted to the control section 40, and the control section 40 controls such that the self-propelled vacuum cleaner 1 is stopped or changes its direction.

On the other hand, if the obstacle BL is not detected by the ultrasonic sensor 6 while the self-propelled vacuum cleaner 1 is traveling, the bumper $2c_1$ collides against the obstacle BL. When the moving object detection units 43b provided on the inside of the bumper $2c_1$ detect that the bumper $2c_1$ collides against the obstacle BL, the detection signal is transmitted to the control section 40, and the control section 40 controls such that the self-propelled vacuum cleaner 1 is stopped or changes its direction.

The moving object detection units 43b corresponding respectively to the left part, the right part, and the front part of the bumper $2c_1$ are provided, and they can detect whether or not the self-propelled vacuum cleaner 1 collides against the obstacle BL present on the left side, on the right side, and just in front of the housing 2.

The moving object detection units 43b are turned on or off when the bumper $2c_1$ is pushed, and the detection distance of the moving object detection units 43b is about 5 mm.

The housing direction detection sensor 44b is a sensor for detecting the direction of the housing 2. A gyro sensor for measuring an angular velocity is used for the housing direction detection sensor 44b, for example.

Instead of using the gyro sensor, encode signals based on the rotation angle of the motors that drive the drive wheels 22L and 22R may be respectively counted, and the rotation angle of the housing 2 may be estimated based on the difference between the counted values.

The floor surface detection sensors 18 for detecting the floor surface are mounted on the center position on the front part, the positions of the left and right side brushes 10, and the center position on the rear part of the bottom plate 2a of the housing 2 shown in FIG. 2 as described above. When the floor surface detection sensors 18 detect a downward level difference, the detection signal is transmitted to the control section 40 described later, and the control section 40 controls such that the drive wheels 22L and 22R are both stopped. Thus, the self-propelled vacuum cleaner 1 is prevented from falling down the downward level difference. In addition, the control section 40 may control such that, when the floor surface detection sensors 18 detect the downward level difference, the self-propelled vacuum cleaner 1 travels while escaping from the downward level difference.

The floor surface detection sensor 18 at the center on the front part has a detection distance of about several tens of centimeters, and the left and right floor surface detection sensors 18FR and 18FL have a detection distance of about 10 centimeters.

A pair of left and right charging terminals 13 for charging the built-in battery is provided on the front end of the bottom plate 2a of the housing 2. The self-propelled vacuum cleaner 1 which performs a cleaning operation while autonomously traveling around a room returns to a charging station installed in the room after finishing the cleaning operation.

Specifically, the self-propelled vacuum cleaner 1 recognizes the direction where the charging station installed on the floor surface is present by detecting, for example, an infrared signal transmitted from the charging station, and autonomously travels, while avoiding the obstacle BL, to return to the charging station.

Accordingly, the charging terminals 13 on the self-propelled vacuum cleaner 1 are brought into contact with a power supply terminal section provided to the charging station, and the power supply terminal section is connected to a positive-electrode terminal and a negative-electrode terminal of the battery through the charging terminals 13. Thus, the battery is charged.

Note that, basically, the self-propelled vacuum cleaner 1 does not automatically operate but in a stand-by state, when it is charged.

Moreover, the charging station connected to a commercial power supply (socket) is generally installed in a room along a sidewall (SW). The battery supplies electric power to drive control elements such as various motors and the control circuit.

As described above, the self-propelled vacuum cleaner 1 is in contact with the floor surface on three points which are the left and right drive wheels 22L and 22R and the rear wheel 26, and the weight of the self-propelled vacuum cleaner 1 is distributed in such a balance that loss of contact of the rear wheel 26 with the floor surface is prevented even when the self-propelled vacuum cleaner 1 suddenly stops while moving forward.

Therefore, even when suddenly stopping in front of the downward level difference while moving forward, the self-propelled vacuum cleaner 1 is prevented from falling down the downward level difference by leaning forward due to the sudden stop. Notably, each of the drive wheels 22L and 22R is formed by inserting, into a wheel, a rubber tire which has a tread pattern (groove) formed on a contact area to prevent the drive wheels 22L and 22R from slipping even when the self-propelled vacuum cleaner 1 suddenly stops.

The suction opening 31 is a recessed open surface formed on the bottom surface (lower surface of the bottom plate 2a) of the housing 2 so as to face the floor surface. The rotary brush 9 rotating around a horizontal axis parallel to the bottom surface of the housing 2 is provided in the recess, and the side brushes 10 rotating around an axis perpendicular to the bottom surface of the housing 2 are provided on both the left and right sides of the recess. The rotary brush 9 is formed of brushes erected in a spiral manner on the outer peripheral surface of a roller serving as a rotary shaft. Each of the side brushes 10 is formed by providing brush bundles in a radial manner on the lower end of a rotary shaft. The rotary shaft of the rotary brush 9 and the rotary shafts of the pair of side brushes 10 are pivotally supported to a portion of the bottom plate 2a of the housing 2, and connected so as to be rotatable to the brush motor 52 provided in the vicinity thereof through a power transmission mechanism including a pulley and a belt.

In the housing 2, a suction path is formed between the suction opening 31 and the dust-collecting box 15a, and an exhaust path is formed between the dust-collecting box 15a and the exhaust opening 32. As shown in FIG. 4, air containing dust suctioned into the housing 2 through the suction opening 31 is guided into the dust-collecting box 15a through the suction path and a suction opening $15a_1$ of the dust-collecting box 15a as indicated by an arrow A. At that time, the rotary brush 9 rotates to sweep up dust on the floor surface into the suction opening 31, and the pair of side brushes 10 rotates to collect dust present on the right and left of the suction opening 31 into the suction opening 31.

After dust is collected in the dust-collecting box 15a, air from which dust is removed through the filter 15b is discharged to the outside from the exhaust opening 32 through a discharge opening $15a_2$ of the dust-collecting box 15a, a duct 114 connected to the discharge opening $15a_2$, and the electrically powered fan 50 and the exhaust path 34 connected to the duct 114, as indicated by an arrow B. Note that, in FIG. 4, a cover 15c of the dust-collecting box 15a covers the filter 15b.

The self-propelled vacuum cleaner 1 moves forward by forward rotations of the left and right drive wheels 22L and 22R in the same direction, moves backward by reverse rotations in the same direction, and turns when the left and right drive wheels 22L and 22R rotate in opposite directions. For example, when reaching the end of the region to be cleaned or when colliding against the obstacle BL on a travel course, the self-propelled vacuum cleaner 1 stops the drive wheels 22L and 22R, and then, rotates the left and right drive wheels 22L and 22R by amounts of rotation different from each other to change the direction. Thus, the self-propelled vacuum cleaner 1 can autonomously travel around a place where it is installed or an entire desired region, while efficiently avoiding the obstacle BL.

<Bumper $2c_1$, Collision Detection Unit 43, and Configuration Around Bumper $2c_1$ and Collision Detection Unit 43>

As shown in FIG. 1, the semicircular bumper $2c_1$ has circular holes formed on the central position in the circumferential direction and on a plurality of positions on each the left and right sides of the central position, and ultrasonic wave transmitting units $6b_1$ and ultrasonic wave receiving units $6b_2$ of the ultrasonic sensor 6 are provided on the inner surface of the bumper $2c_1$ so as to be exposed from the respective holes.

If two ultrasonic wave transmitting units $6b_1$ are used, they are switched to emit ultrasonic waves such that there are two cycles in one minute (500 ms for one ultrasonic wave transmitting unit $6b_1$). If five ultrasonic wave transmitting units $6b_1$ are used, they are switched to emit ultrasonic waves such that there are five cycles in one minute (200 ms for one ultrasonic wave transmitting unit $6b_1$).

The ultrasonic sensor may be configured such that a plurality of ultrasonic wave transmitting units $6b_1$ simultaneously emits ultrasonic waves without being switched every cycle.

In the first embodiment, five holes are formed on the bumper $2c_1$ in line. The ultrasonic wave receiving units $6b_2$ are disposed in the holes on the central position and on both left and right ends, and the ultrasonic wave transmitting units $6b_1$ are disposed in two holes adjacent to the central position.

A control unit 6a (FIG. 3) causes the ultrasonic wave transmitting unit $6b_1$ of the ultrasonic sensor 6 to emit an ultrasonic wave, calculates a distance L to the obstacle BL on the basis of a time from when the transmitted ultrasonic wave is reflected on the obstacle BL until the reflected wave is received by the ultrasonic wave receiving unit $6b_2$, and transmits the calculated distance to the control section 40 as a detection signal.

The precision of the distance L calculated by the ultrasonic sensor 6 is about 1 mm.

Note that, beside the ultrasonic sensor 6, other sensors such as an infrared sensor or a laser sensor may be used.

The bumper $2c_1$ is fitted to the peripheral edge of a front opening $2x_1$ of the housing main body $2x$ constituted by the ends of the bottom plate $2a$, the top plate $2b$, and the rear side plate $2c_2$ so as to cover the front opening $2x_1$. In this case, the bumper $2c_1$ is supported by a fitting structure which is movable in the front-rear direction and in the left-right direction relative to the housing main body $2x$ and does not fall from the front opening $2x_1$.

<Travel Operation Procedure of Self-Propelled Vacuum Cleaner 1>

Next, the travel operation procedure of the self-propelled vacuum cleaner 1 will be described with reference to FIGS. 7 to 14.

Figure 7:
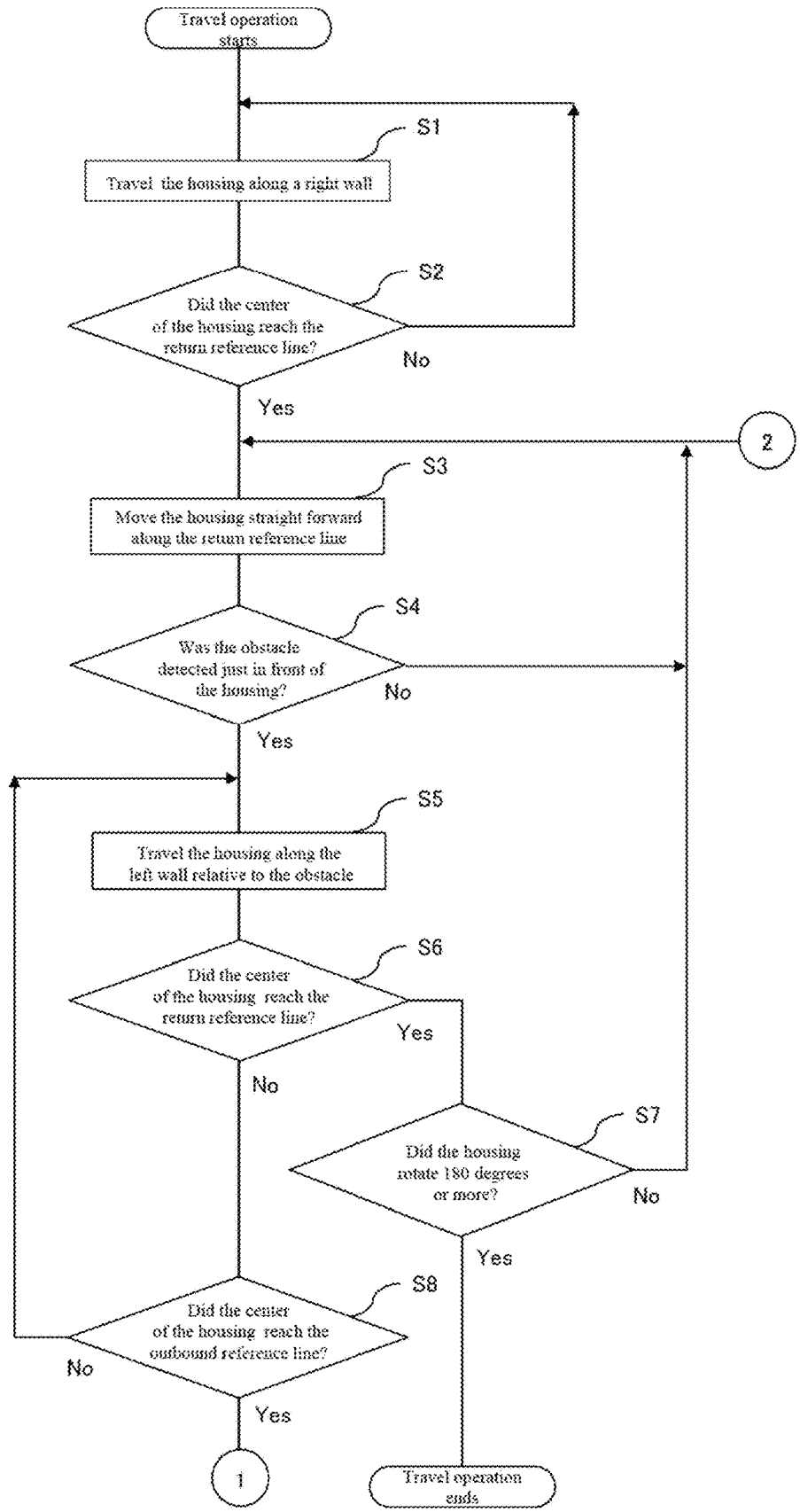
FIG. 7 is a flowchart showing a travel operation of the self-propelled vacuum cleaner according to a first embodiment of the present invention.
Figure 8:
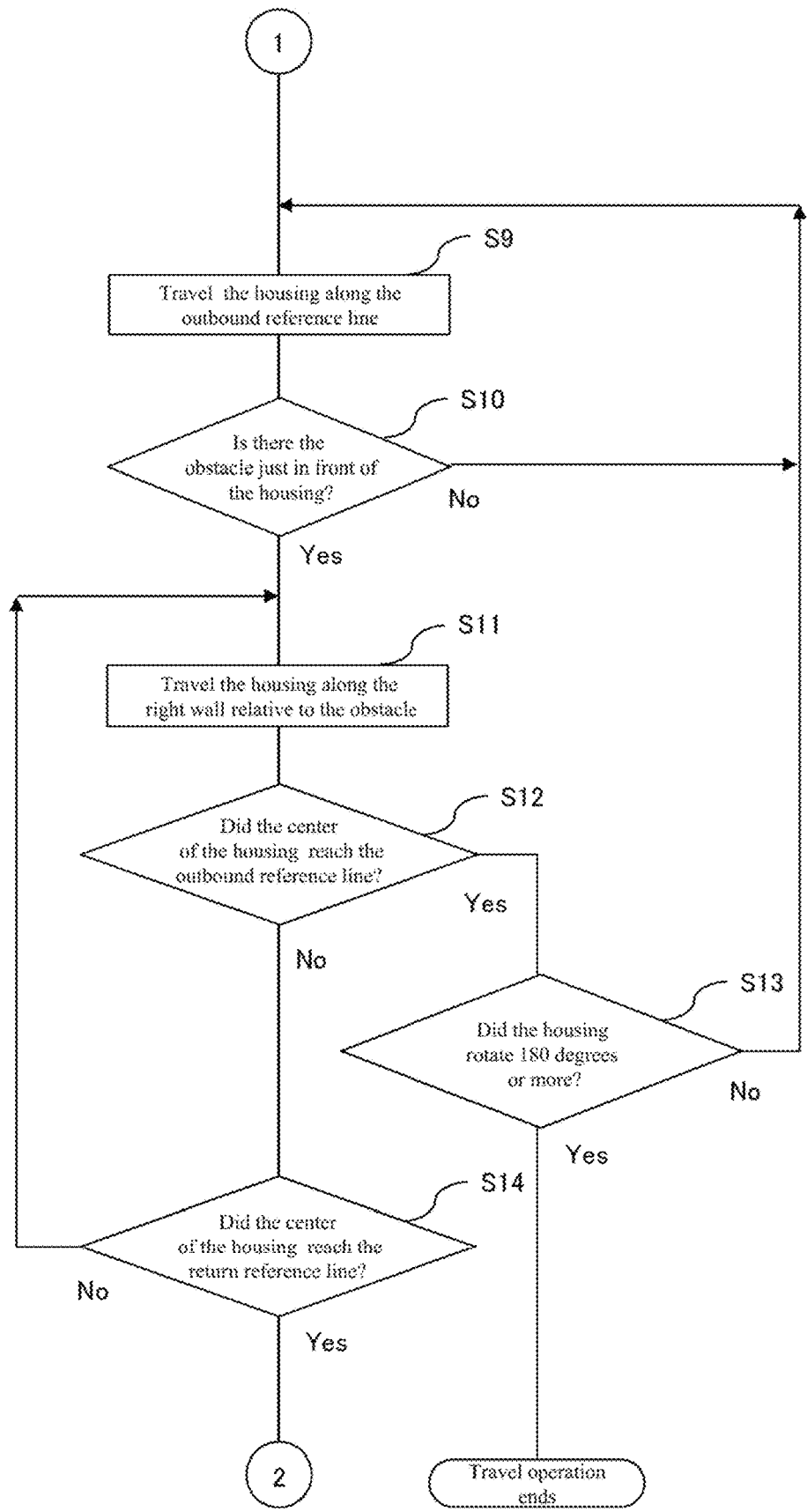
FIG. 8 is a flowchart showing a travel operation of the self-propelled vacuum cleaner according to the first embodiment of the present invention.

FIGS. 7 and 8 are flowcharts showing the travel operation of the self-propelled vacuum cleaner 1 according to the first embodiment of the present invention. FIGS. 9 to 13 are explanatory views showing one example of the travel operation of the self-propelled vacuum cleaner 1 according to the first embodiment of the present invention.

In step S1 in FIG. 7, the control section 40 causes the housing 2 to travel along a right wall by driving the travel motors 51 by the motor driver 51a, while causing the ultrasonic sensor 6 to detect the obstacle BL (step S1).

Herein, "to cause the housing 2 to travel along a right (left) wall" means that the control section 40 causes the housing 2 to travel such that the obstacle BL or the sidewall SW is located on the right (left) side of the housing 2.

Figure 9:
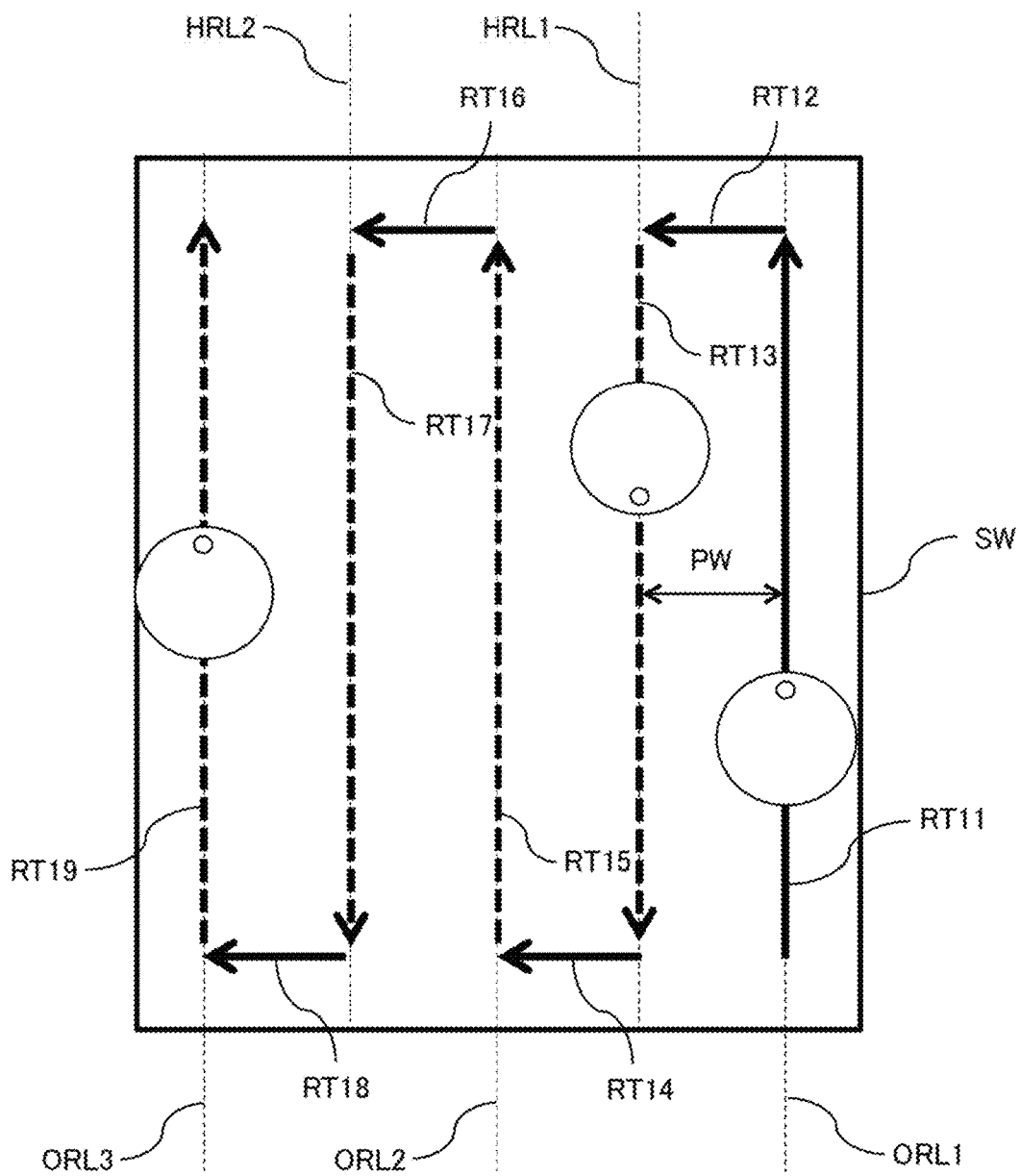
FIG. 9 is an explanatory view showing one example of the travel operation of the self-propelled vacuum cleaner according to the first embodiment of the present invention.

It is supposed that the housing 2 moves straight along a route RT11 along the right wall relative to the sidewall SW as shown in FIG. 9. When detecting that the housing 2 reaches the end of the route RT11 and detecting that the housing 2 collides against the front wall by the moving object detection unit 43b, the control section 40 turns (changes the direction of) the housing 2 by 90 degrees in the counterclockwise direction. Then, the control section 40 causes the housing 2 to move straight along a route RT12 along the right wall.

The route RT11 for the housing 2 along the right wall is defined as an outbound reference dine ORL1.

In the example in FIG. 9, the outbound reference line ORL1, a return reference line HRL1, an outbound reference line ORL2, a return reference line HRL2, and an outbound reference line ORL3 are defined from the right.

The control section 40 calculates a change in the position of the housing 2 on the basis of the rotational amounts of the travel motors 51 inputted from the encoder. For example, when the center of the housing 2 reaches a position distant from the outbound reference line ORL1 by a predetermined pitch width PW, the control section 40 sets a straight line which passes through the position and which is parallel to the outbound reference line ORL1 as a next return reference line HRL1.

The control section 40 sets such that outbound reference lines ORL and return reference lines HRL are alternately defined with the predetermined pitch width PW therebetween as shown in FIG. 9.

Herein, the pitch width PW is generally set to be almost equal to the diameter of the housing 2. For example, if the diameter of the housing 2 is 30 cm, the pitch width PW is also set to be 30 cm. However, if the tip of the rotary brush 9 protrudes outward from the side surface of the housing 2, the pitch width PW may be set to be slightly larger than the diameter of the housing 2 by the protruding length. On the contrary, the pitch width PW may be set to be smaller than the diameter of the housing 2. In this case, when the self-propelled vacuum cleaner 1 travels in a zigzag manner, some regions are cleaned once more.

Next, in step S2, the control section 40 determines whether or not the center of the housing 2 reaches the return reference line HRL (step S2).

The control section 40 determines whether or not the center of the housing 2 reaches the return reference line HRL based on whether or not the housing 2 advances by the predetermined pitch width PW from the previous outbound reference line ORL.

When the housing 2 reaches the return reference line HRL (Yes in step S2), the control section 40 causes the housing 2 to move straight forward along the return reference line HRL in step S3 (step S3).

On the other hand, when the housing 2 does not reach the return reference line HRL (No in step S2), the control section 40 repeats the process in step S1 (step S1).

In FIG. 9, when the center of the housing 2 reaches the return reference line HRL1 after the housing 2 moves to the route RT12 from the route RT11 along the right wall, the housing 2 turns 90 degrees in the counterclockwise direction (so as to be almost parallel to the outbound direction), and then, moves straight forward along a route RT13 along the return reference line HRL1.

The route RT when the housing 2 travels along the wall is indicated by a solid arrow, and the route RT when the housing 2 travels straight forward along the outbound reference line ORL or the return reference line HRL is indicated by a dotted arrow.

When the route RT along the wall and the outbound reference line ORL or the return reference line HRL match each other, the process for the outbound reference line ORL or the return reference line HRL is given priority. However, the process for traveling along the wall may be given priority.

Next, in step S4, the control section 40 determines whether or not the obstacle BL is detected just in front of the housing 2 (step S4).

Herein, examples of the obstacle BL include furniture such as a drawer, a sofa, or a TV table, household appliances, and the sidewall SW.

When detecting the obstacle BL just in front of the housing 2 in step S4 (Yes in step S4), the control section 40 causes the housing 2 to travel along the left wall relative to the obstacle BL in step S5 (step S5).

On the other hand, when not detecting the obstacle BL just in front of the housing 2 (No in step S4), the control section 40 repeats the determination in step S3 (step S3).

In FIG. 9, the control section 40 detects the obstacle BL (sidewall SW) just in front of the housing 2 after the housing 2 moves straight forward along the route RT13 along the return reference line HRL1, and therefore, the housing 2 travels along a route RT14 along the left wall relative to the sidewall SW.

Next, in step S6, the control section 40 determines whether or not the center of the housing 2 reaches the return reference line HRL (step S6).

When the center of the housing 2 reaches the return reference line HRL (Yes in step S6), the control section 40 performs determination in step S7 (step S7).

On the other hand, when the center of the housing 2 does not reach the return reference line HRL (No in step S6), the control section 40 performs determination in step S8 (step S8).

Next, in step S7, the control section 40 determines whether or not the housing 2 rotates about 180 more (for example, the angle within the range from 135 degrees to 225 degrees is considered to be 180 degrees for the sake of convenience) based on the state when the housing 2 has traveled straight forward along the return reference line HRL in step S3 (step S7).

When the housing 2 rotates 180 degrees or more (Yes in step S7), the control section 40 ends the travel operation.

On the other hand, when the housing 2 does not rotate 180 degrees or more (No in step S7), the control section 40 repeats the process in step S3 (step S3).

In FIG. 9, when the housing 2 detects the obstacle BL (sidewall SW) just in front of the housing 2 after moving straight forward along a route RT17 along the return reference line HRL2, the housing 2 travels along a route RT18 along the left wall. Then, the housing 2 travels along a route RT19 along the outbound reference line ORL3.

Figure 10:
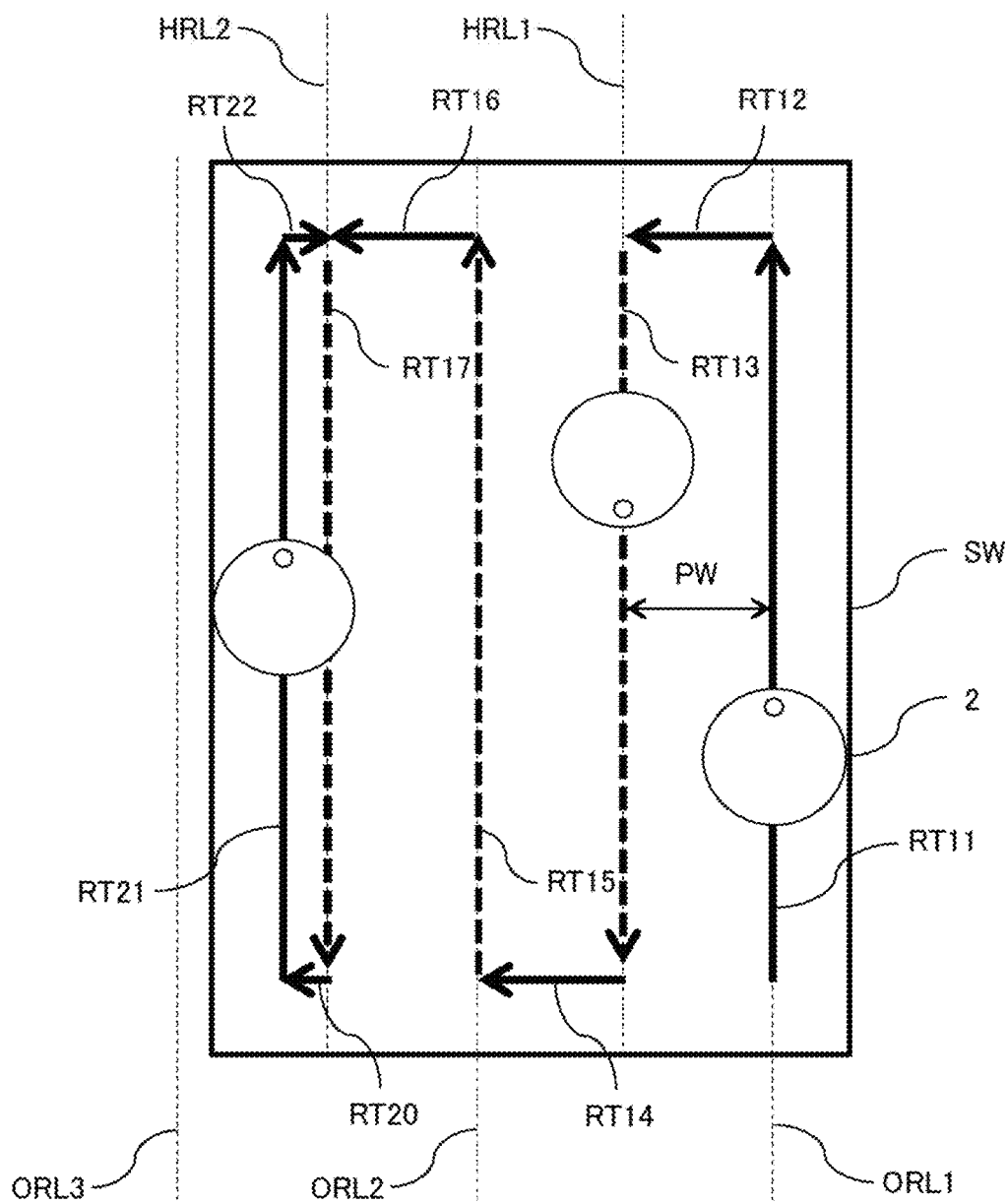
FIG. 10 is an explanatory view showing one example of the travel operation of the self-propelled vacuum cleaner according to the first embodiment of the present invention.

On the other hand, in FIG. 10, when the housing 2 detects the obstacle BL (sidewall SW) just in front of the housing 2 after moving straight forward along the route RT17 along the return reference line HRL2, the housing 2 travels along a route RT20 along the left wall.

In this case, before reaching the next outbound reference line ORL3, the center of the housing 2 collides against the sidewall SW. Therefore, the housing 2 keeps traveling along the left wall along routes RT21 and RT22. With this movement, the center of the housing 2 reaches again the return reference line HRL2, but the housing 2 rotates 180 degrees or more based on the state when the housing 2 has traveled straight forward along the return reference line HRL2.

When the housing 2 returns to the return reference line HRL2 while rotating 180 degrees or more by traveling through a loop of routes RT17 and RT20 to RT22 as described above, the control section 40 determines that the housing 2 travels around every region surrounded by the sidewall SW, and ends the travel operation.

Figure 11:
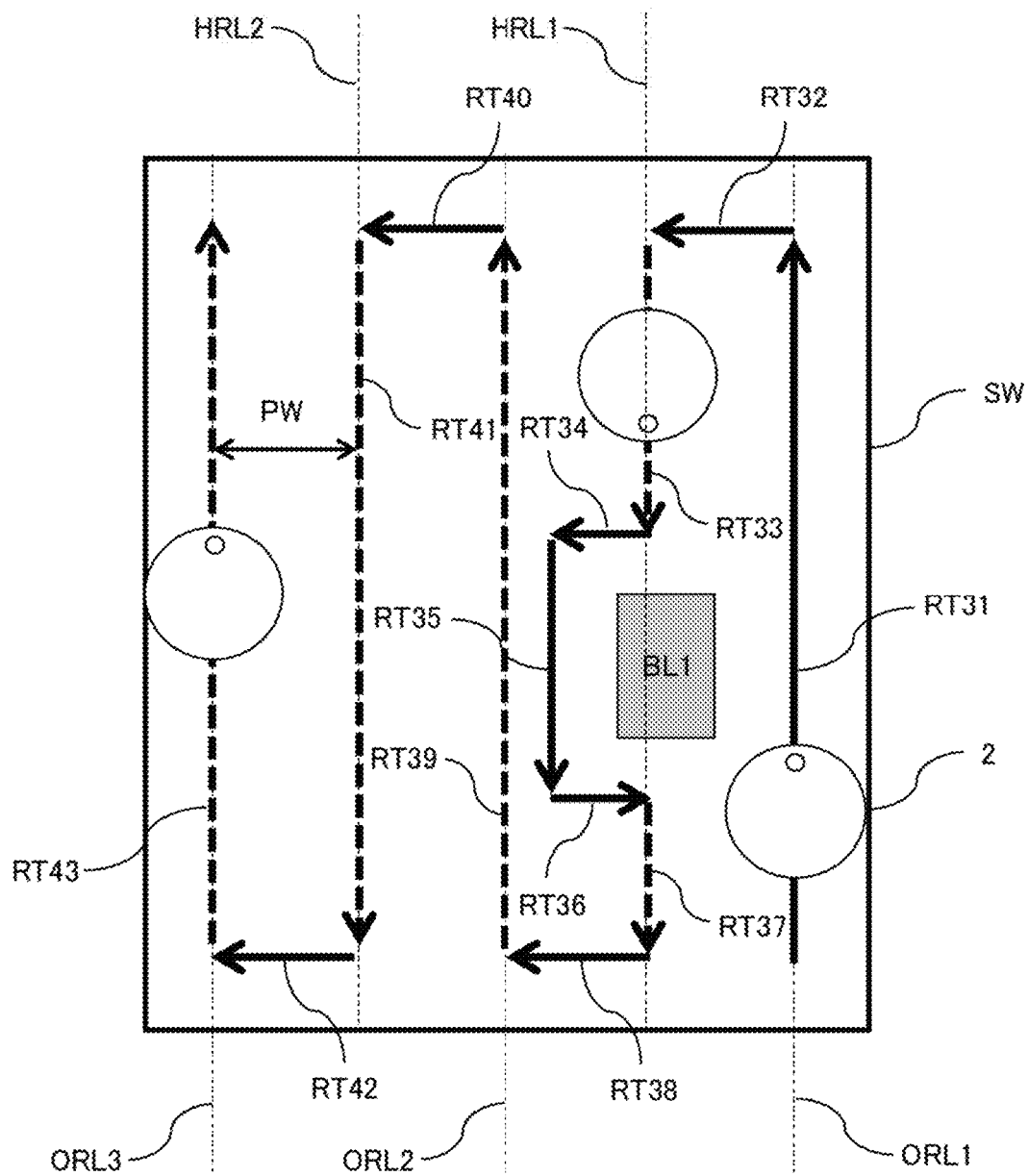
FIG. 11 is an explanatory view showing one example of the travel operation of the self-propelled vacuum cleaner according to the first embodiment of the present invention.

On the other hand, when the housing 2 detects an obstacle BL1 just in front of the housing 2 after moving straight forward along a route RT33 along the return reference line HRL1, the housing 2 travels along routes RT34 to RT36 along the left wall relative to the obstacle BL1, as shown in FIG. 11.

Accordingly, the center of the housing 2 reaches again the return reference line HRL1, but the housing 2 does not rotate 180 degrees or more based on the state when the housing 2 has previously traveled along the return reference line HRL1.

When the housing 2 returns to the return reference line HRL1 again by traveling through the routes RT34 to RT36 which bypass the obstacle BL1 as described above, the control section 40 continues the travel operation of the housing 2.

Next, in step S8 in FIG. 7, the control section 40 determines whether or not the center of the housing 2 reaches the outbound reference line ORL (step S8).

Note that whether or not the center of the housing 2 reaches the outbound reference line ORL can be determined by calculating a displacement amount of the center position from an angle obtained from a gyro sensor and rotation amounts of the travel motors 51 inputted from the encoder. The same is applied to the return reference line HRL.

When the center of the housing 2 reaches the outbound reference line ORL (Yes in step S8), the control section 40 causes the housing 2 to move straight forward along the outbound reference line ORL in step S9 in FIG. 8 (step S9).

On the other hand, when the center of the housing 2 does not reach the outbound reference line ORL (No in step S8), the control section 40 repeats the process in step S5 (step S5).

In FIG. 9, after moving along the route RT14 along the left wall, the housing 2 rotates 90 degrees in the clockwise direction when the center of the housing 2 reaches the outbound reference line ORL2, and then, moves straight forward along a route RT15 along the outbound reference line ORL2.

Next, in step S10 in FIG. 8, the control section 40 determines whether or not there is the obstacle BL just in front of the housing 2 (step S10).

If there is the obstacle BL just in front of the housing 2 (Yes in step S10), the control section 40 causes the housing 2 to travel along the right wall relative to the obstacle BL in step S11 (step S11).

On the other hand, if there is no obstacle BL just in front of the housing 2 (No in step S10), the control section 40 repeats the process in step S9 (step S9).

In FIG. 9, when the housing 2 detects the obstacle BL (sidewall SW) just in front of the housing 2 after moving straight forward along the route RT15 along the outbound reference line ORL2, the housing 2 travels along a route RT16 along the right wall.

Then, in step S12, the control section 40 determines whether or not the center of the housing 2 reaches the outbound reference line ORL (step S12).

When the center of the housing 2 reaches the outbound reference line ORL (Yes in step S12), the control section 40 performs determination in step S13 (step S13).

On the other hand, when the center of the housing 2 does not reach the outbound reference line ORL (No in step S12), the control section 40 performs determination in step S14 (step S14).

Next, in step S13, the control section 40 determines whether or not the housing 2 rotates 180 degrees or more based on the state when the housing 2 has moved straight forward along the outbound reference line ORL in step S9 by using the housing direction detection sensor 44b (step S13).

If the housing 2 rotates 180 degrees or more (Yes in step S13), the control section 40 ends the travel operation.

On the other hand, if the housing 2 does not rotate 180 degrees or more (No in step S13), the control section 40 repeats the process in step S9 (step S9).

Figure 12:
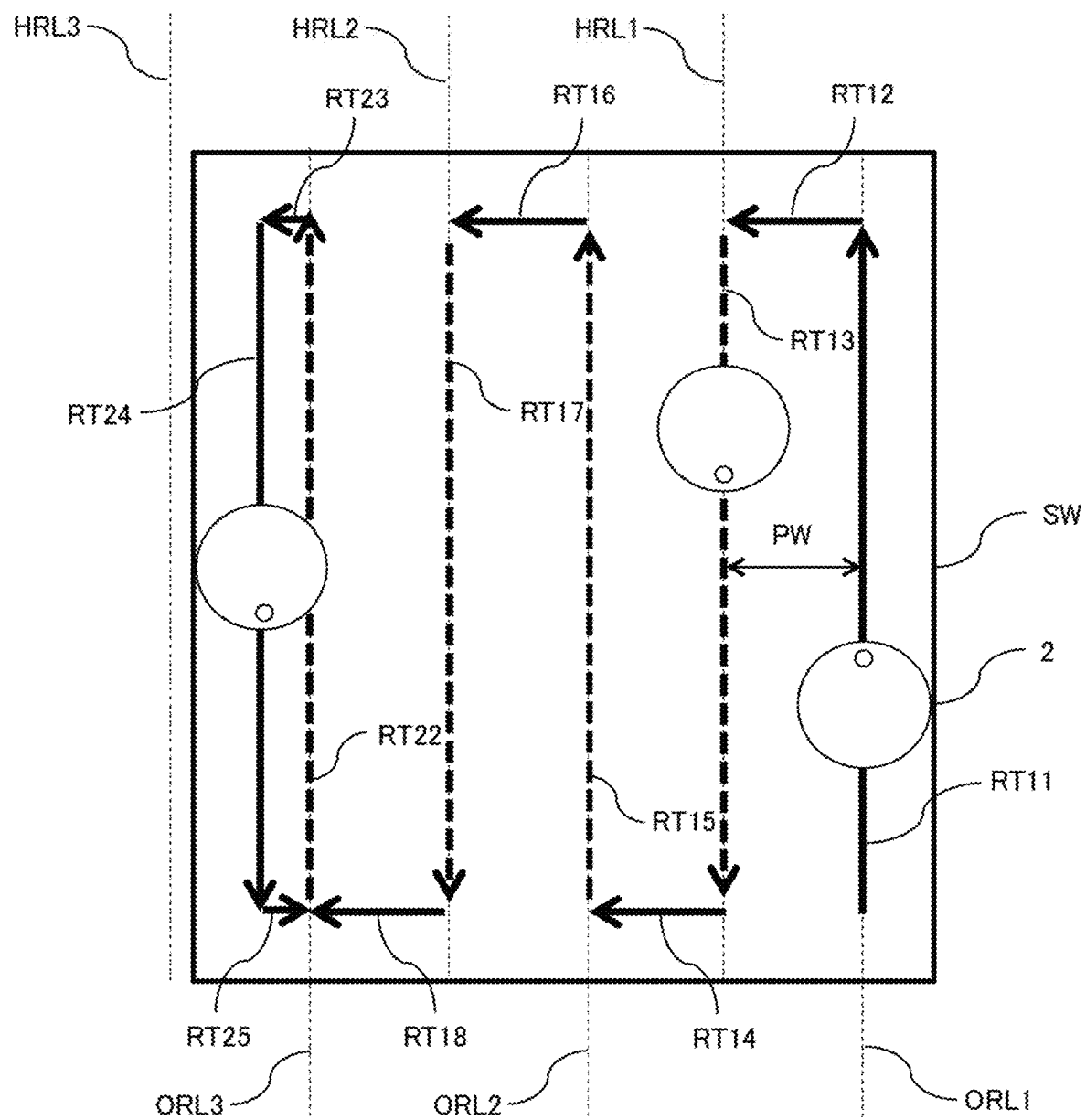
FIG. 12 is an explanatory view showing one example of the travel operation of the self-propelled vacuum cleaner according to the first embodiment of the present invention.

In FIG. 12, when the housing 2 detects the obstacle BL (sidewall SW) just in front of the housing 2 after moving straight forward along the route RT22 along the outbound reference line ORL3, the housing 2 travels along a route RT23 along the right wall.

In this case, before reaching the next return reference line HRL3, the center of the housing 2 collides against the sidewall SW. Therefore, the housing 2 keeps traveling along the right wall through routes RT24 and RT25. With this movement, the center of the housing 2 reaches again the outbound reference line ORL3, but the housing 2 rotates 180 degrees or more based on the state when the housing 2 has previously moved straight forward along the outbound reference line ORL3.

When the housing 2 returns to the outbound reference line ORL3 while rotating 180 degrees or more by traveling through a loop of routes RT22 to RT25 as described above, the control section 40 determines that the housing 2 travels around every region surrounded by the sidewall SW, and ends the travel operation.

Figure 13:
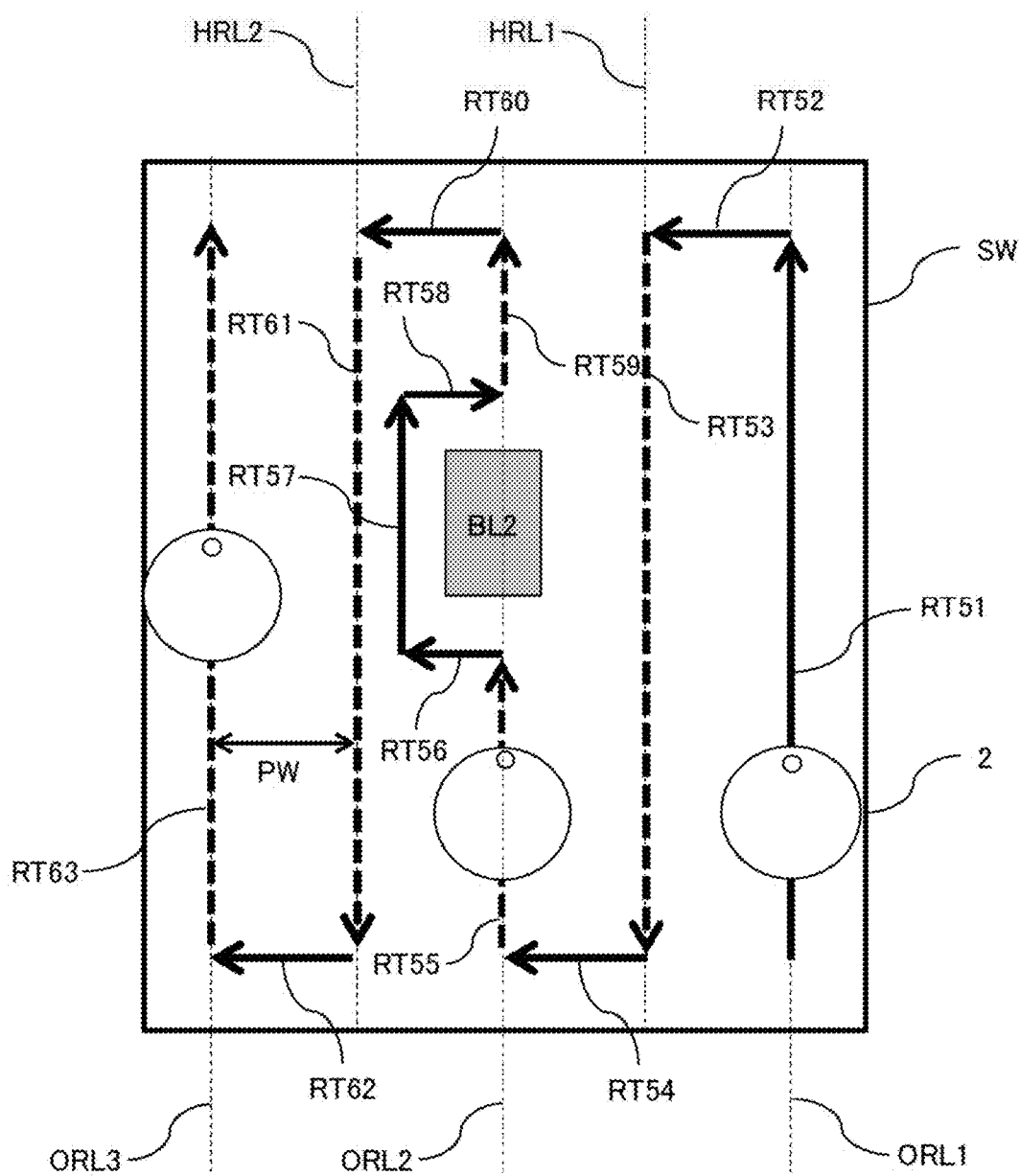
FIG. 13 is an explanatory view showing one example of the travel operation of the self-propelled vacuum cleaner according to the first embodiment of the present invention.

On the other hand, as shown in FIG. 13, when the housing 2 detects an obstacle BL2 just in front of the housing 2 after moving straight forward along a route RT55 along the outbound reference line ORL2, the housing 2 travels through routes RT56 to RT58 along the right wall relative to the obstacle BL2.

Accordingly, the center of the housing 2 reaches again the outbound reference line ORL2, but the housing 2 does not rotate 180 degrees or more based on the state when the housing 2 has previously traveled along the outbound reference line ORL2.

When the housing 2 returns to the outbound reference line ORL2 again by traveling through the routes RT56 to RT58 which bypass the obstacle BL2 as described above, the control section 40 continues the travel operation of the housing 2.

Lastly, in step S14 in FIG. 8, the control section 40 determines whether or not the center of the housing 2 reaches the return reference line HRL (step S14).

If the center of the housing 2 reaches the return reference line HRL (Yes in step S14), the control section 40 repeats the process in step S3 (step S3).

On the other hand, if the center of the housing 2 does not reach the return reference line HRL (No in step S14), the control section 40 repeats the process in step S11 (step S10).

In FIG. 12, after moving along the route RT16 along the right wall, the housing 2 rotates 90 degrees in the counter-clockwise direction when the center of the housing 2 reaches again the return reference line HRL2, and then, moves straight forward along the route RT17 along the return reference line HRL2.

In this way, a self-propelled electronic device can be implemented that can travel everywhere around a room in a zigzag manner, even when there is an obstacle BL in the room, while avoiding the obstacle BL.

Second Embodiment

<Travel Operation Procedure of Self-Propelled Vacuum Cleaner 1 According to Second Embodiment of the Present Invention>

Next, a travel operation procedure of a self-propelled vacuum cleaner 1 according to a second embodiment of the present invention will be described with reference to FIGS. 14 to 19.

Figure 14:
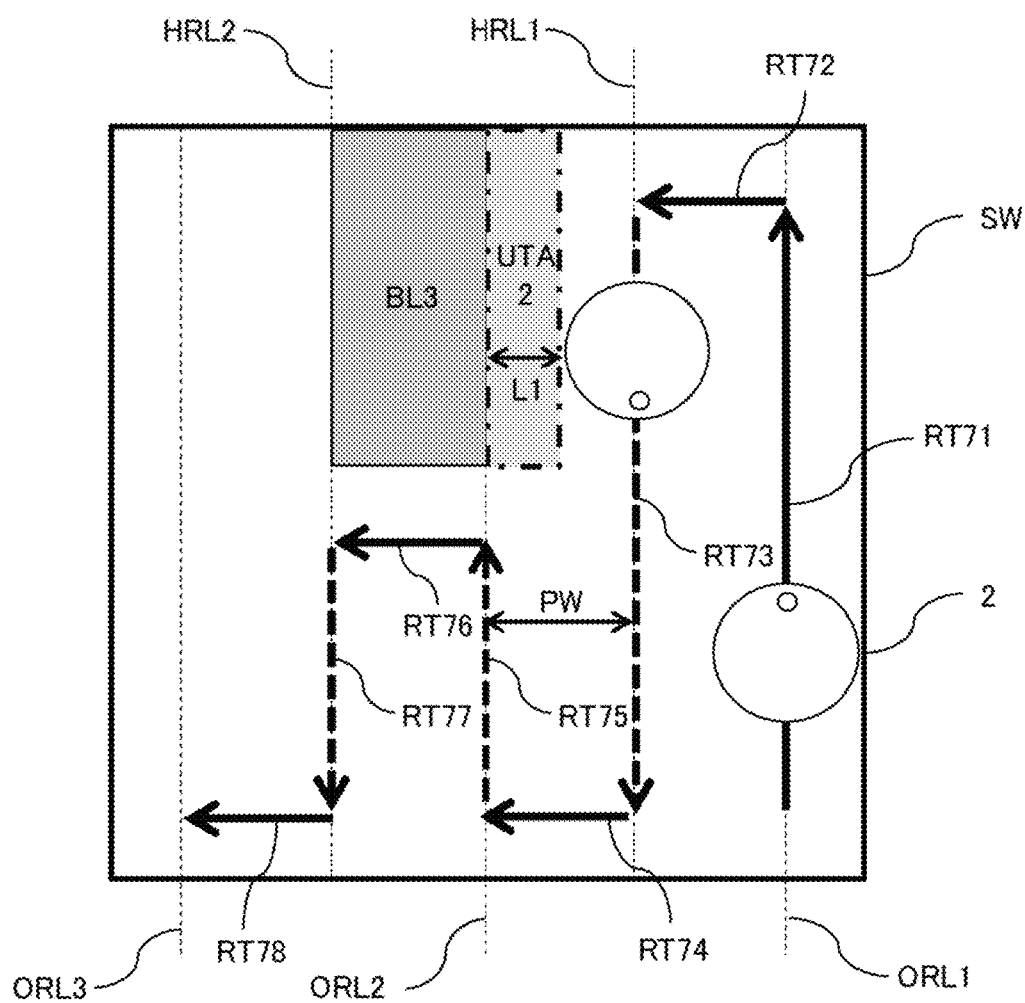
FIG. 14 is an explanatory view showing one example of the travel operation of the self-propelled vacuum cleaner according to the first embodiment of the present invention.
Figure 15:
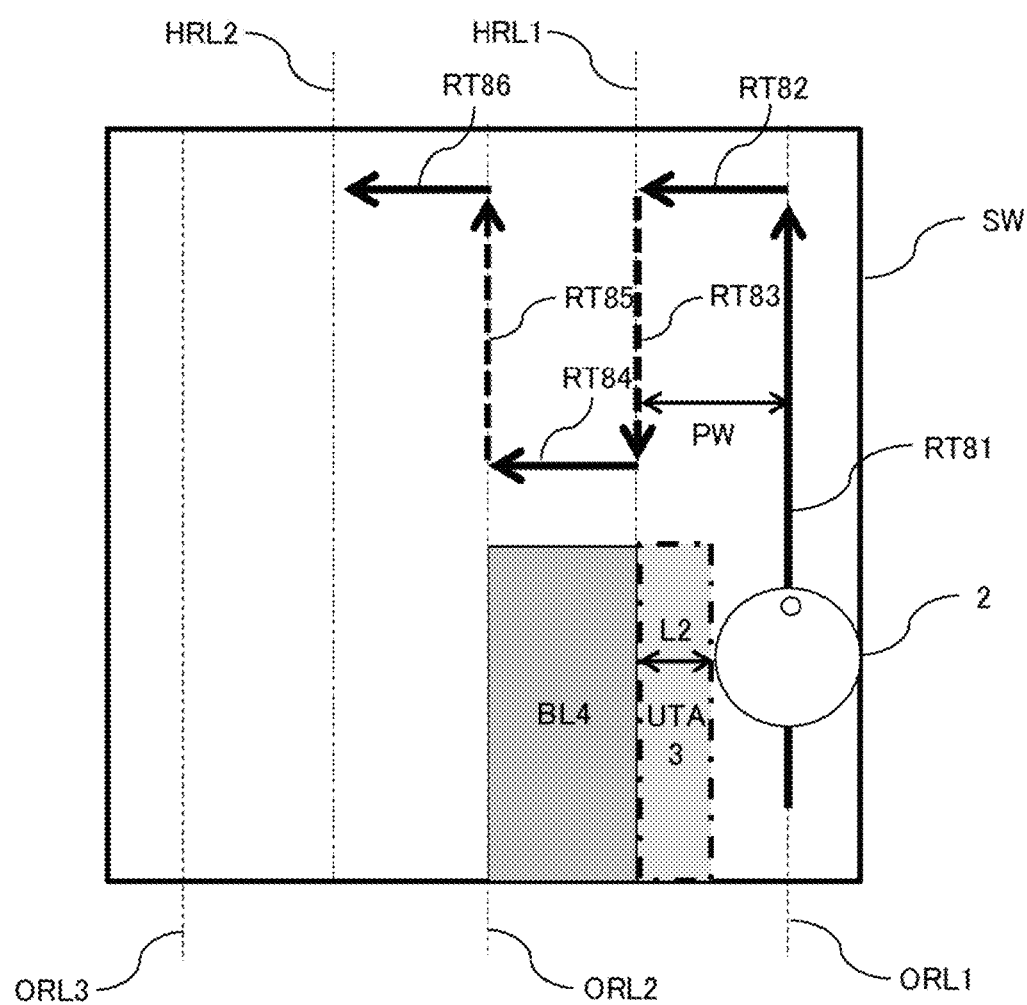
FIG. 15 is an explanatory view showing one example of the travel operation of the self-propelled vacuum cleaner according to the first embodiment of the present invention.
Figure 16:
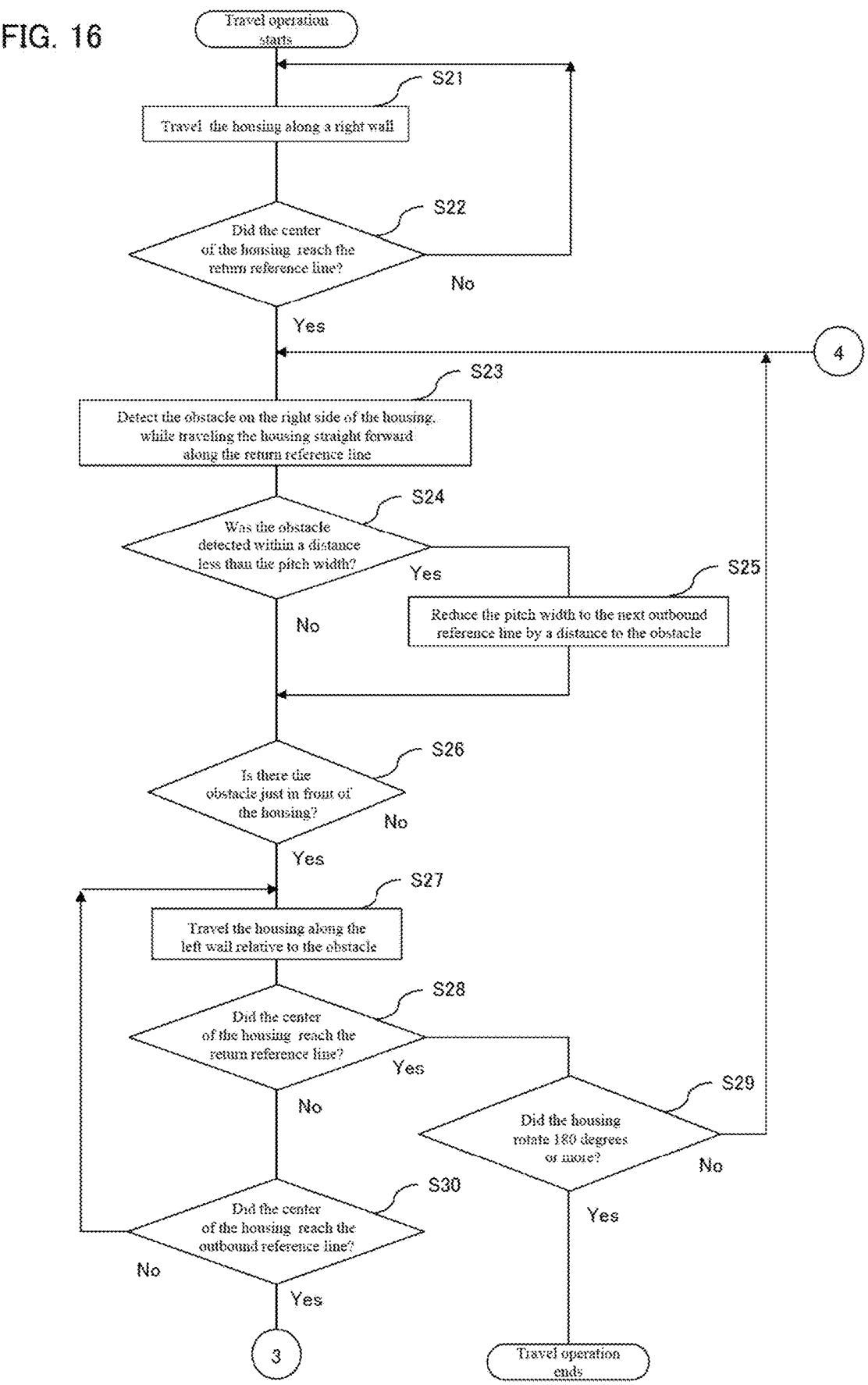
FIG. 16 is a flowchart showing travel operation of a self-propelled vacuum cleaner according to a second embodiment of the present invention.
Figure 17:
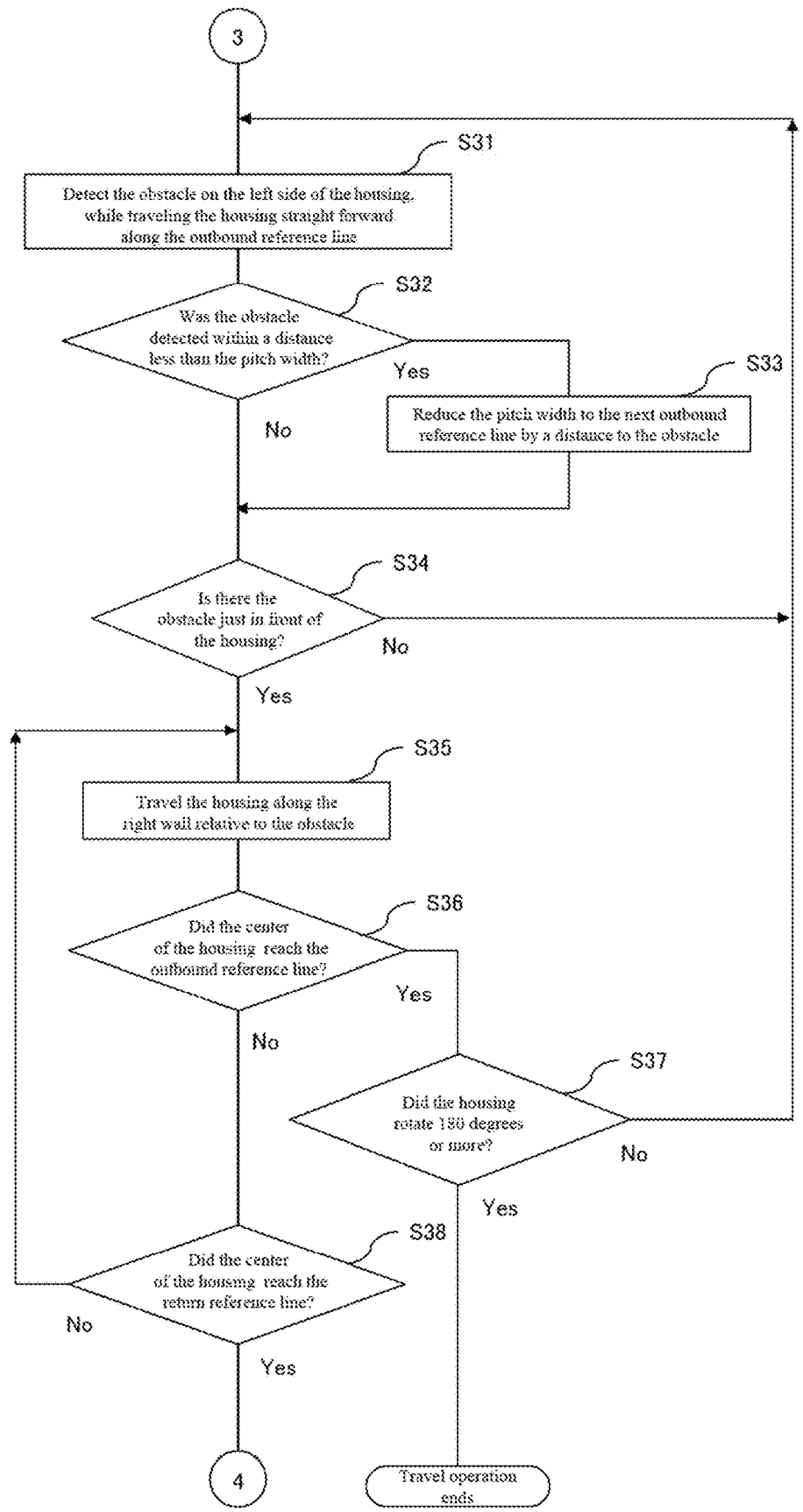
FIG. 17 is a flowchart showing a travel operation of a self-propelled vacuum cleaner according to a second embodiment of the present invention.

FIGS. 14 and 15 are explanatory views showing one example of the travel operation of the self-propelled vacuum cleaner 1 according to the first embodiment of the present invention. FIGS. 16 and 17 are flowcharts showing the travel operation of the self-propelled vacuum cleaner 1 according to the second embodiment. FIGS. 18 and 19 are explanatory views showing one example of the travel operation of the self-propelled vacuum cleaner 1 according to the second embodiment of the present invention.

As shown in FIG. 14, when the self-propelled vacuum cleaner 1 travels according to the travel operation procedure in the first embodiment in a state where an obstacle BL3 is provided on one side of the sidewall SW, the housing 2 travels along routes RT71 to RT78.

When doing so, the housing 2 travels in a zigzag manner based on the pitch width PW. Therefore, if a distance L1 between the housing 2 traveling straight forward along the return reference line HRL1 and the obstacle BL3 is less than the pitch width PW (that is, L1<PW), an untraveled area UTA2 (an area enclosed by a dash-dot line in FIG. 14) may be generated around the obstacle BL3.

Further, as shown in FIG. 15, when the self-propelled vacuum cleaner 1 travels according to the travel operation procedure in the first embodiment in a state where an obstacle BL4 is provided on one side of the sidewall SW, the housing 2 travels along routes RT81 to RT86.

When doing so, the housing 2 travels in a zigzag manner based on the pitch width PW. Therefore, if a distance L2 between the housing 2 traveling straight forward along the outbound reference line ORL1 and the obstacle BL4 is less than the pitch width PW (that is, L2<PW), an untraveled area UTA3 (an area enclosed by a dash-dot line in FIG. 15) may be generated around the obstacle BL4.

To address such a problem, the second embodiment describes the travel operation procedure of the self-propelled vacuum cleaner 1 that prevents the untraveled area UTA from being generated even when the obstacle BL is present at a position inconsistent with the pitch width PW during the zigzag travel of the housing 2.

Steps S21, S22, and S26 to S30 in FIG. 16 respectively correspond to steps S1, S2, and S4 to S8 in FIG. 7, and therefore, the description thereof will be omitted.

Steps S34 to S38 in FIG. 17 respectively correspond to steps S10 to S14 in FIG. 8, and therefore, the description thereof will be omitted.

Hereinbelow, steps S23 to S25 and S31 to S33 which are not shown in FIGS. 7 and 8 will be described.

In step S22, when the center of the housing 2 reaches the return reference line HRL (Yes in step S2), the control section 40 causes the ultrasonic sensor 6 to detect the obstacle BL on the right side of the housing 2, while causing the housing 2 to travel straight forward along the return reference line HRL in step S23 (step S23).

Then, in step S24, the control section 40 determines whether or not the obstacle BL is detected within a distance less than the pitch width PW (step S24).

When detecting the obstacle BL within a distance less than the pitch width PW (Yes in step S24), the control section 40 temporarily reduces the pitch width PW to the next outbound reference line ORL by a distance L from the side surface of the housing 2 to the obstacle BL in step S25 (step S25).

On the other hand, when not detecting the obstacle BL within a distance less than the pitch width PW (No in step S24), the control section 40 performs determination in step S26 (step S26).

It should be noted that the reduction in the pitch width PW is only applied to the next outbound reference line ORL, and the default pitch width PW is used as usual for those after the next line. In view of this, to distinguish the temporarily reduced pitch width PW from the default pitch width PW, the temporarily reduced pitch width PW is referred to as a "modified pitch width MPW" below.

Next, one example of the travel operation of the housing 2 of the self-propelled vacuum cleaner 1 when the travel operation in the second embodiment is applied is shown in FIG. 18 where the obstacle BL3 is present at the same position as in FIG. 14.

Figure 18A:
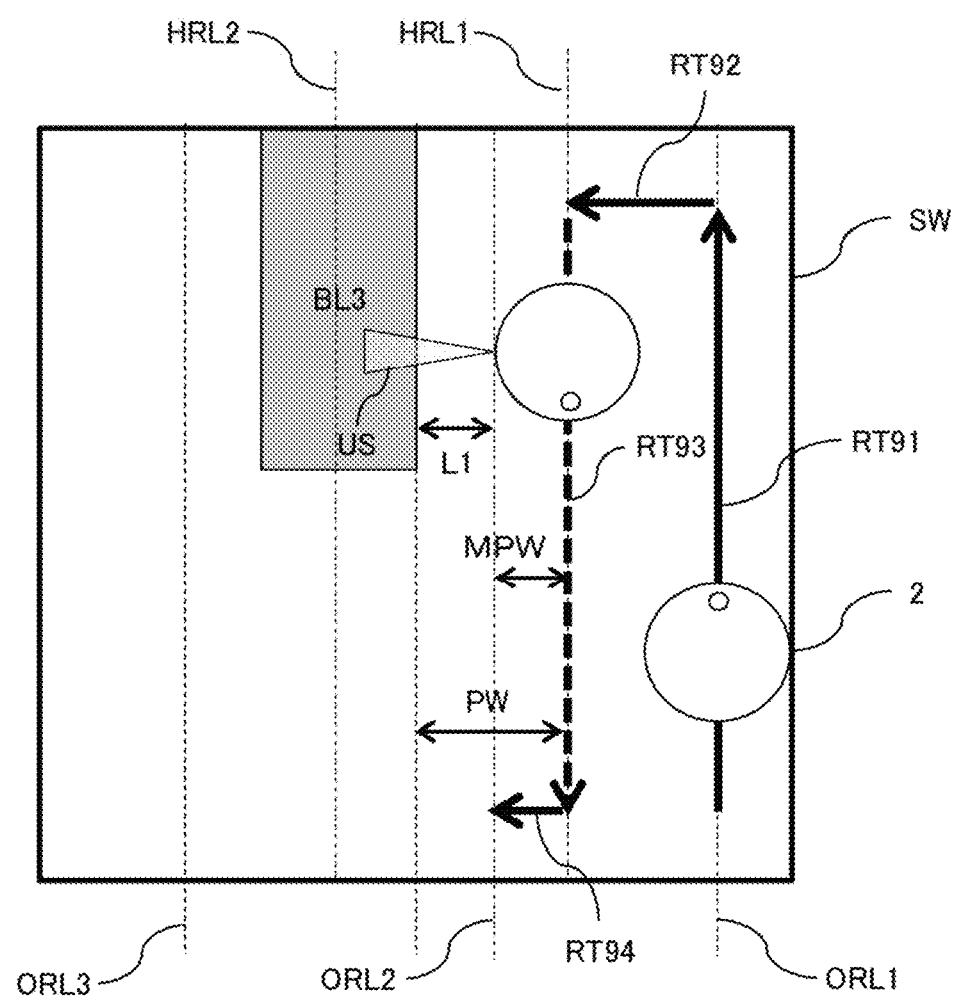
FIG. 18(A) is an explanatory view showing one example of the travel operation of the self-propelled vacuum cleaner according to the second embodiment of the present invention.
Figure 18B:
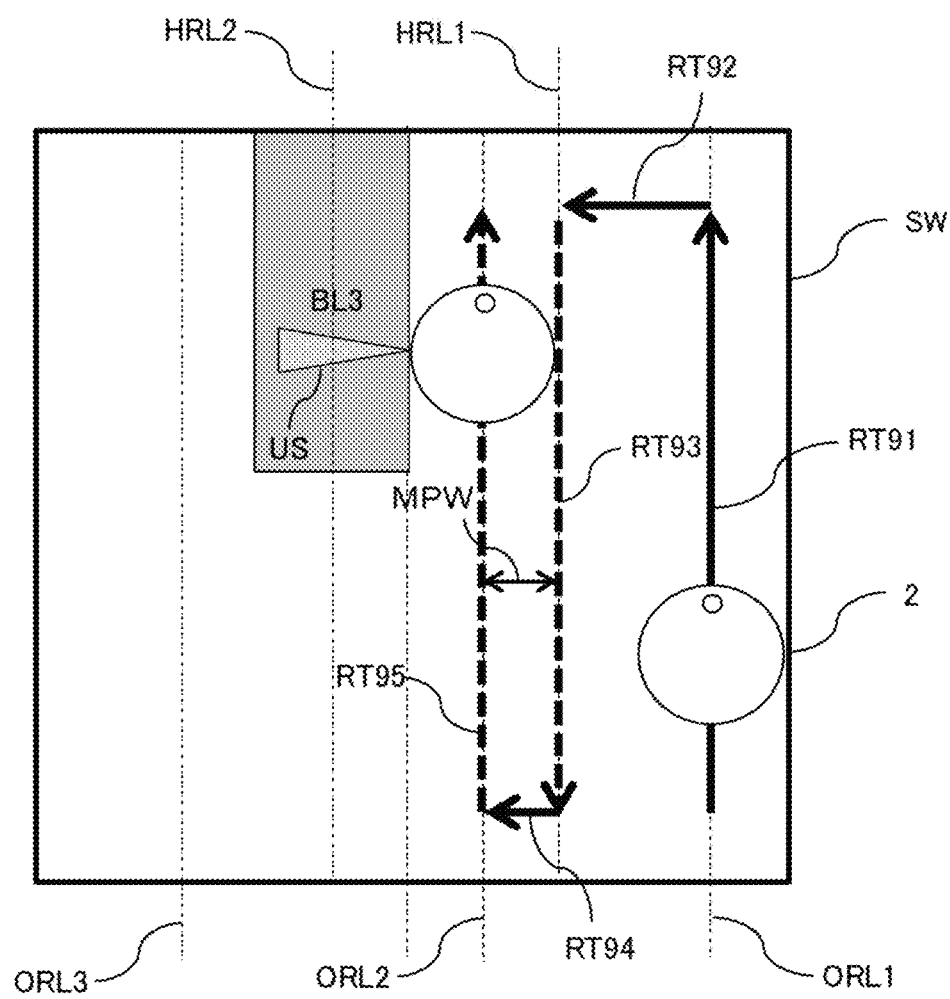
FIG. 18(B) is an explanatory view showing one example of the travel operation of the self-propelled vacuum cleaner according to the second embodiment of the present invention.
Figure 18C:
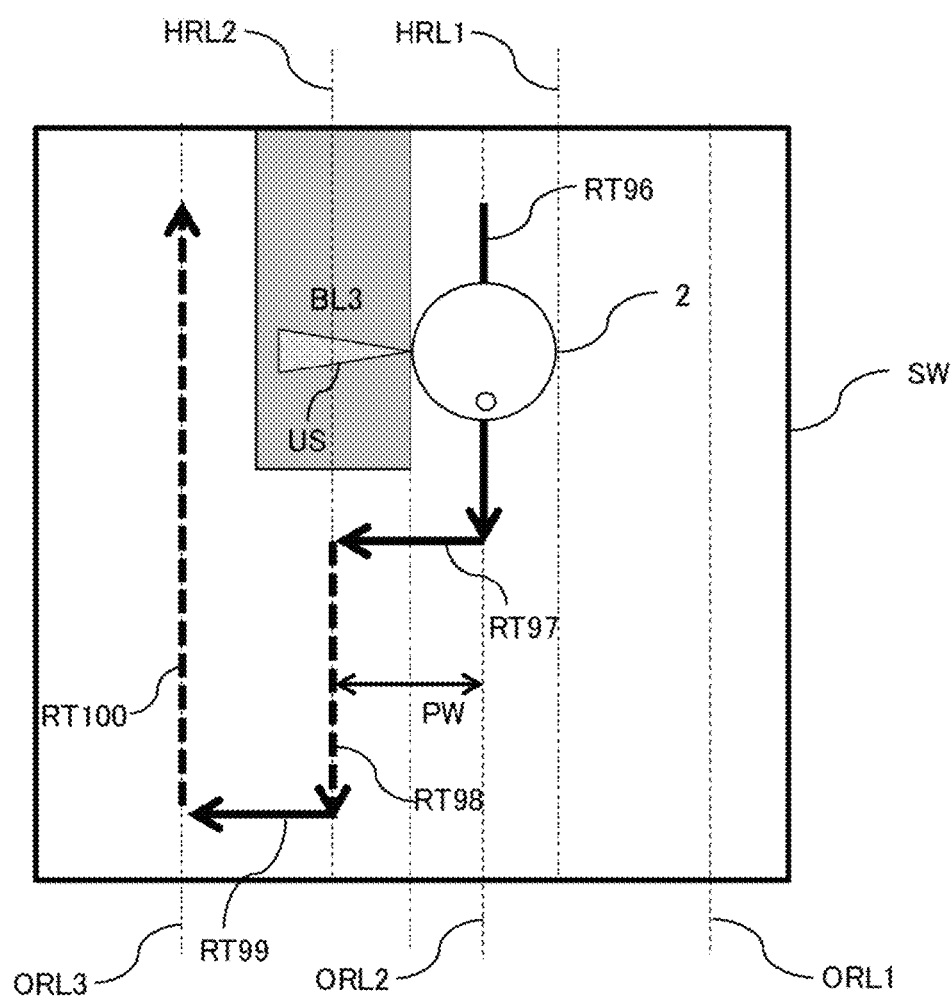
FIG. 18(C) is an explanatory view showing one example of the travel operation of the self-propelled vacuum cleaner according to the second embodiment of the present invention.

In FIG. 18(A), after traveling along routes RT91 and RT92 along the right wall, the housing 2 moves straight forward along a route RT93 along the return reference line HRL1. When doing so, the housing 2 emits an ultrasonic signal US from the right side of the housing 2 by using the ultrasonic sensor 6 to detect whether or not there is an obstacle BL at the right side of the housing 2. In FIGS. 18(A) to (C), US indicates a transmission area of the ultrasonic signal. This is also applied to the other drawings.

When detecting the obstacle BL3 on the right side of the housing 2, the housing 2 measures a distance L1 from the housing 2 to the obstacle BL3, and stores the measured distance L1 into the storage unit 42.

Then, when detecting an obstacle BL (sidewall SW) just in front of the housing 2, the housing 2 travels along a route RT94 along the left wall.

In this case, the modified pitch width MPW to the next outbound reference line ORL2 is PW−L1 obtained by subtracting the distance L1 from the predetermined default pitch width PW.

When reaching the outbound reference line ORL2 which is on a position distant from the return reference line HRL1 by the modified pitch width MPW, while traveling along the route RT94, the housing 2 rotates 90 degrees in the clockwise direction, and then, travels straight forward along a route RT95 along the outbound reference line ORL2, as shown in FIG. 18(B). During traveling, the housing 2 detects the obstacle BL3 on the left side of the housing 2 by the ultrasonic sensor 6.

When detecting the obstacle BL3 on the left side of the housing 2, the housing 2 measures a distance L0 (=0) from the housing 2 to the obstacle BL3, and stores the measured distance L0 into the storage unit 42.

Then, when the obstacle BL (sidewall SW) is detected just in front of the housing 2, the control section 40 causes the housing 2 to travel along routes RT96 and RT97 along the right wall as shown in FIG. 18(C).

In this case, the pitch width PW to the next return reference line HRL2 is PW−L0 obtained by subtracting the distance L0 from the predetermined default pitch width PW.

However, because of L0 being zero, the pitch width PW to the next return reference line HRL2 is equal to the default pitch width PW.

Therefore, in FIG. 18(C), the housing 2 travels along the route RT97 only by the default pitch width PW, and then, rotates 90 degrees in the counterclockwise direction. Thereafter, the housing 2 travels straight forward through a route RT98 along the return reference line HRL2, and then, detects the obstacle BL (sidewall SW), so that the housing 2 moves along a route RT99 along the left wall.

After reaching the outbound reference line ORL3 distant from the return reference line HRL2 by the pitch width PW, the housing 2 rotates 90 degrees in the clockwise direction, and moves straight forward along a route RT100 along the outbound reference line ORL3.

Next, one example of the travel operation of the housing 2 of the self-propelled vacuum cleaner 1 when the travel operation in the second embodiment is applied is shown in FIG. 19 where the obstacle BL4 is present at the same position as in FIG. 15.

Figure 19A:
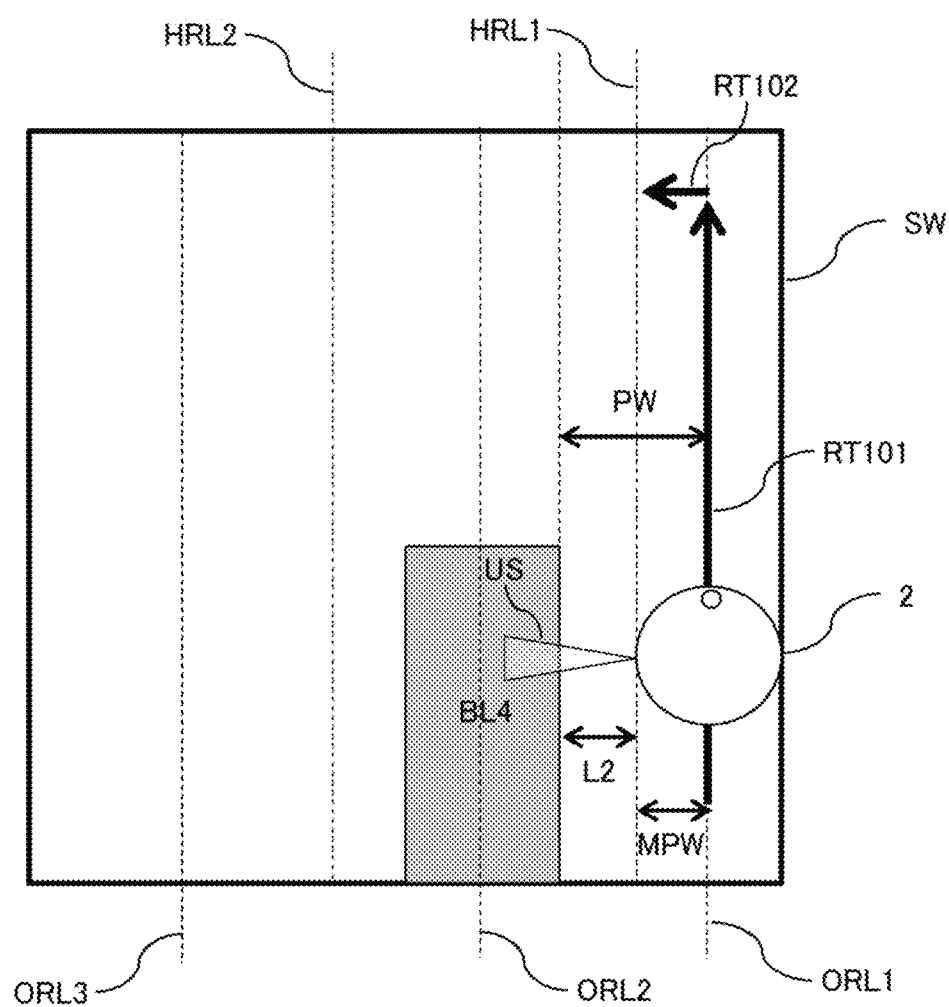
FIG. 19(A) is an explanatory view showing one example of the travel operation of the self-propelled vacuum cleaner according to the second embodiment of the present invention.

In FIG. 19(A), while traveling along a route RT101 along the right wall, the housing 2 detects whether or not there is an obstacle BL on the left side of the housing 2 by using the ultrasonic sensor 6.

When detecting the obstacle BL4 on the left side of the housing 2, the housing 2 measures a distance L2 to the obstacle BL4, and stores the measured distance L2 into the storage unit 42.

Then, when detecting the obstacle BL (sidewall SW) just in front of the housing 2, the housing 2 travels along a route RT102 along the right wall.

In this case, the modified pitch width MPW to the next return reference line HRL1 is PW−L2 obtained by subtracting the distance L2 from the predetermined default pitch width PW.

Figure 19B:
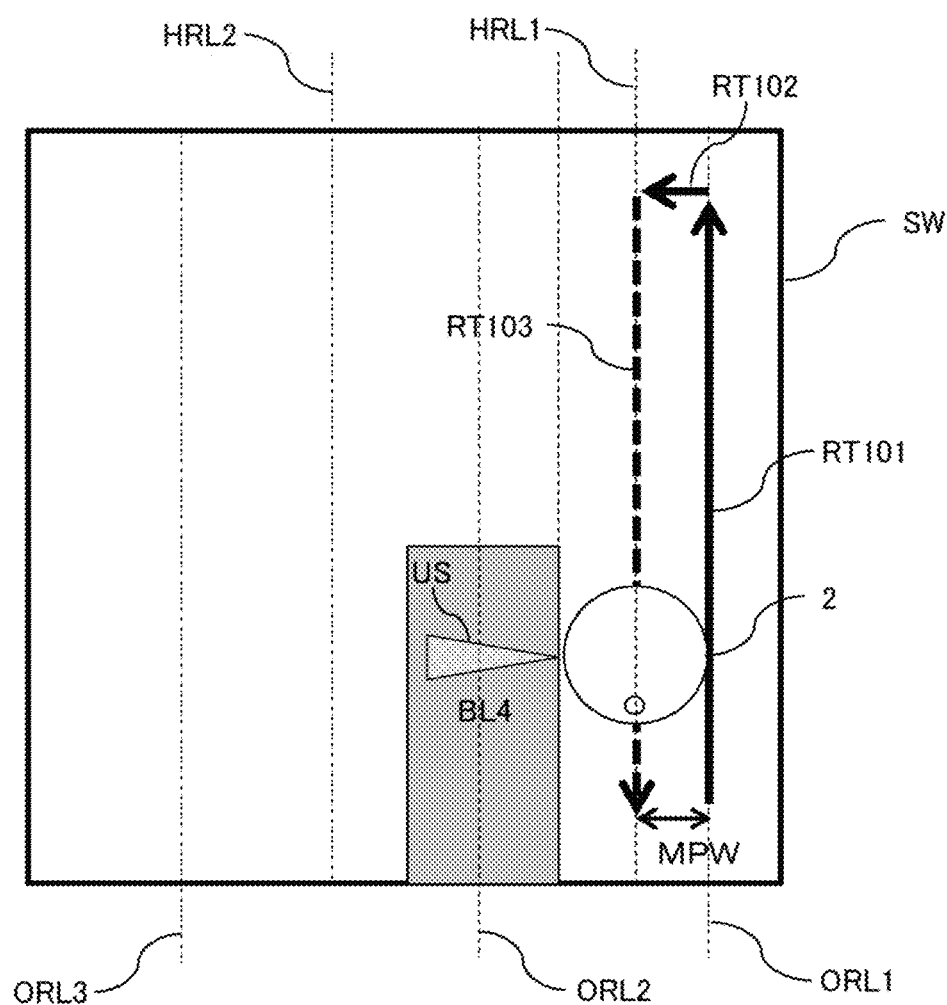
FIG. 19(B) is an explanatory view showing one example of the travel operation of the self-propelled vacuum cleaner according to the second embodiment of the present invention.

When reaching the return reference line HRL1 which is on a position distant from the outbound reference line ORL1 by the modified pitch width MPW, while traveling along the route RT102, the housing 2 rotates 90 degrees in the counterclockwise direction, and then, travels straight forward along a route RT103 along the return reference line HRL1, as shown in FIG. 19(B). During traveling, the housing 2 detects the obstacle BL4 on the right side of the housing 2 by the ultrasonic sensor 6.

Figure 19C:
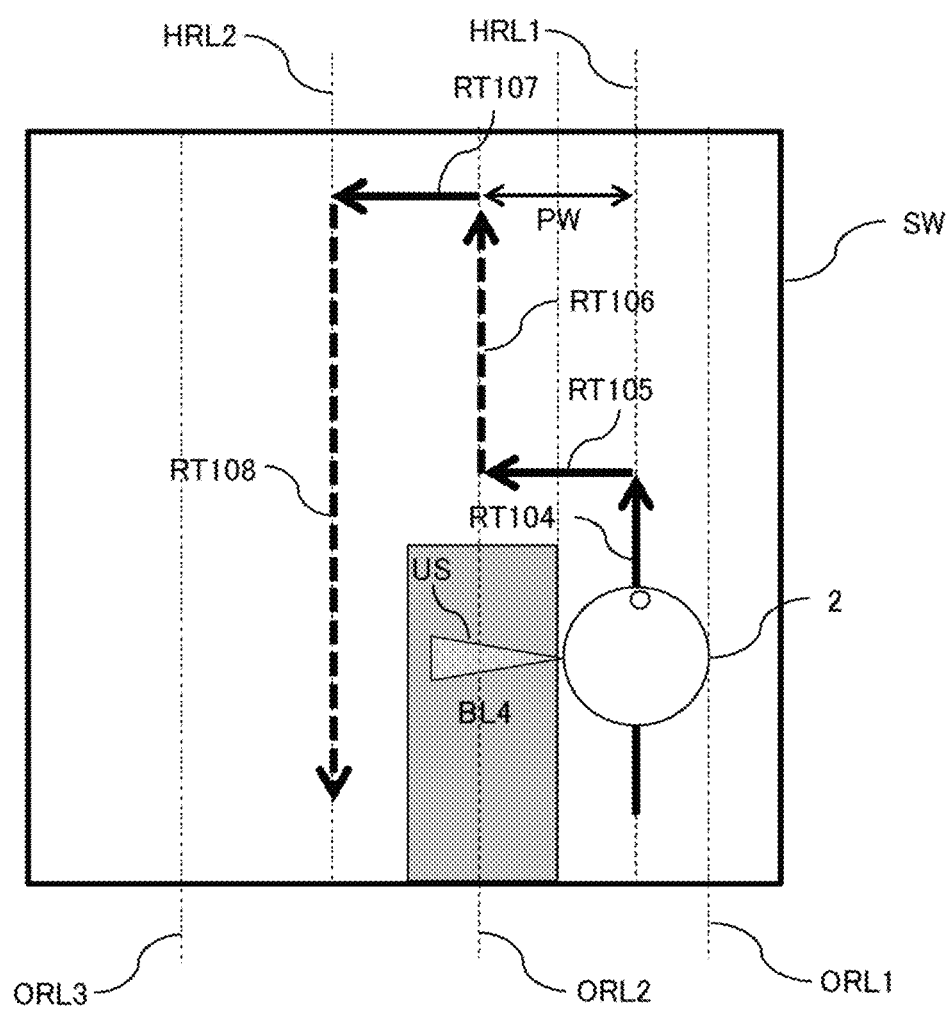
FIG. 19(C) is an explanatory view showing one example of the travel operation of the self-propelled vacuum cleaner according to the second embodiment of the present invention.

Thereafter, the housing 2 travels along routes RT104 to RT108 shown in FIG. 19(C) according to the procedure same as that shown in FIG. 18(C).

In this way, even when there is an obstacle BL at a position inconsistent with the pitch width PW during the zigzag travel of the housing 2, the self-propelled vacuum cleaner 1 can travel everywhere in a room without generating the untraveled area UTA in a region before the housing 2 is in contact with the obstacle BL.

Third Embodiment

<Travel Operation Procedure of Self-Propelled Vacuum Cleaner 1 According to Third Embodiment of the Present Invention>

Next, a travel operation procedure of a self-propelled vacuum cleaner 1 according to a third embodiment of the present invention will be described with reference to FIGS. 20 to 25.

Figure 20:
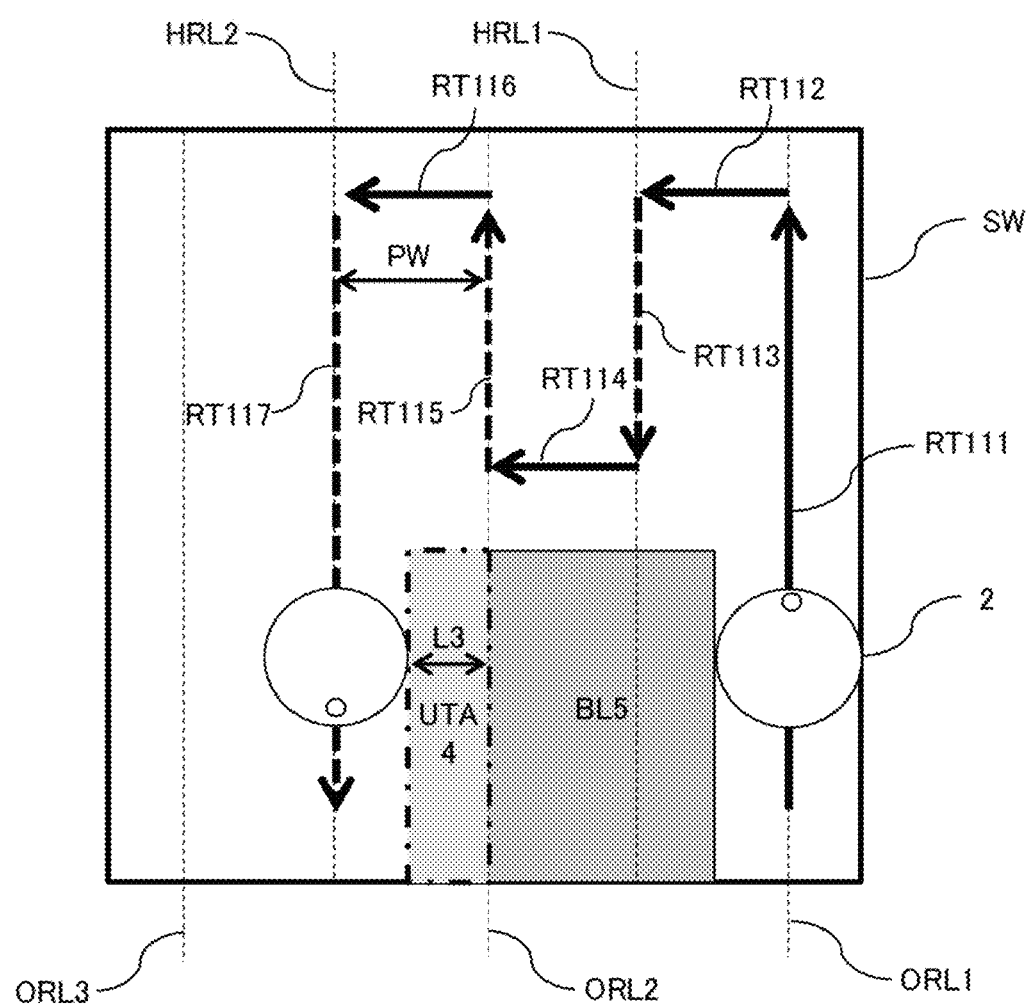
FIG. 20 is an explanatory view showing one example of the travel operation of the self-propelled vacuum cleaner according to the first embodiment of the present invention.
Figure 21:
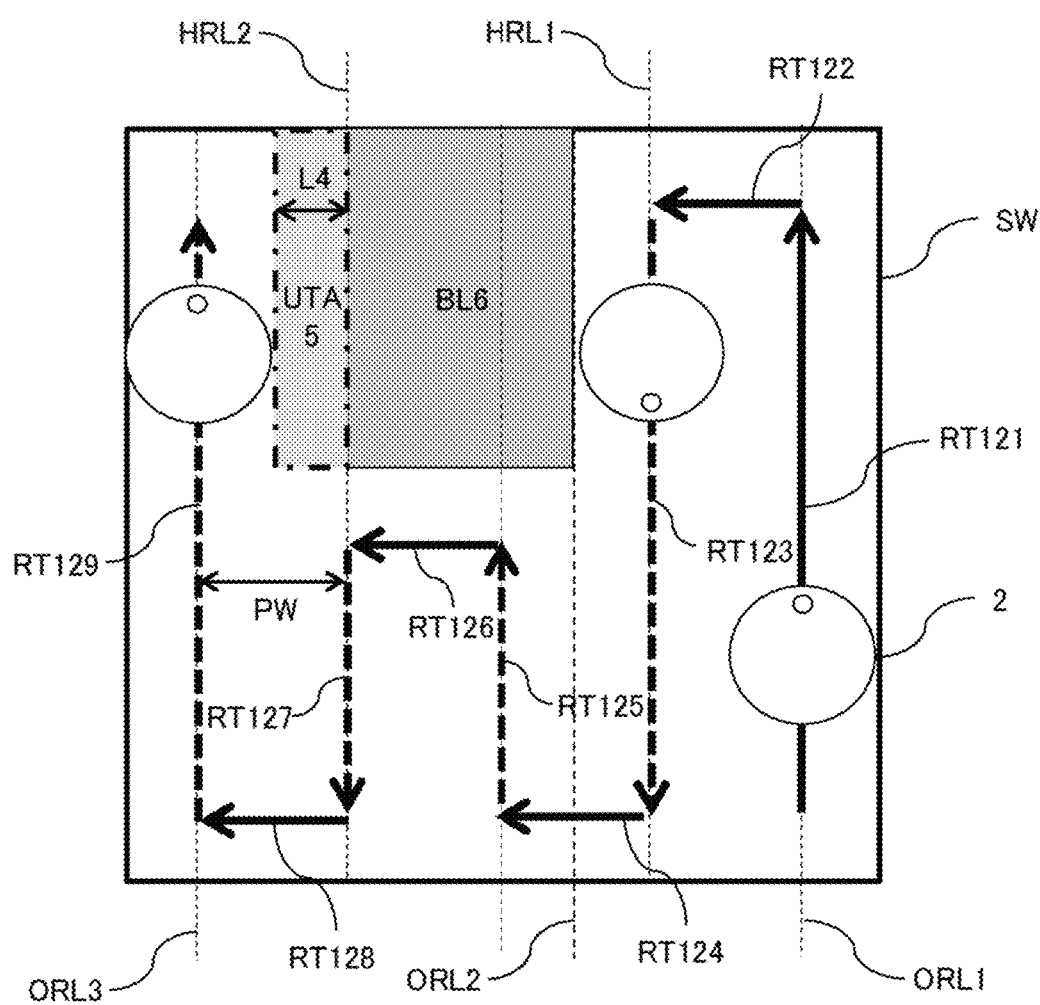
FIG. 21 is an explanatory view showing one example of the travel operation of the self-propelled vacuum cleaner according to the first embodiment of the present invention.
Figure 22:
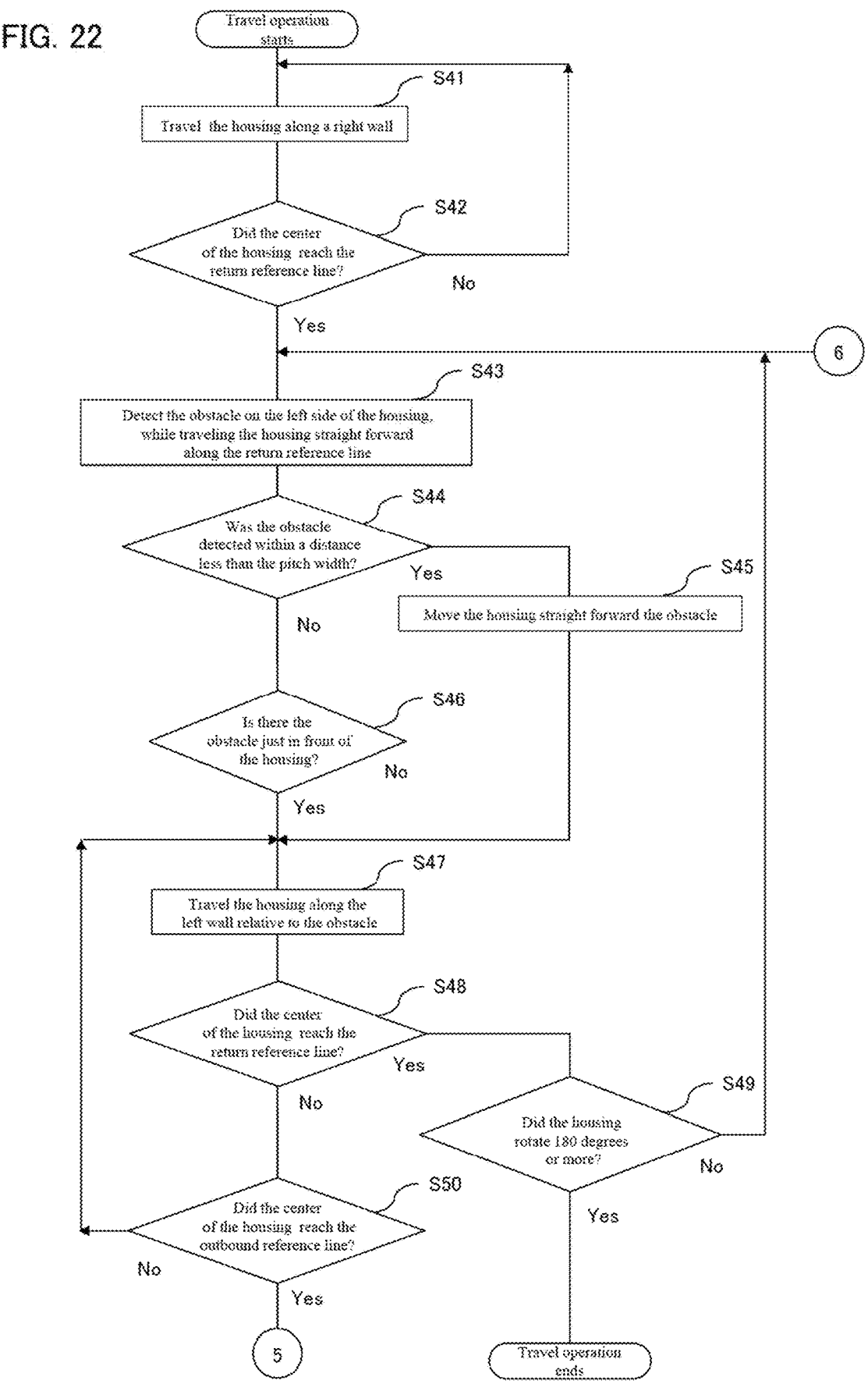
FIG. 22 is a flowchart showing travel operation of a self-propelled vacuum cleaner according to a third embodiment of the present invention.
Figure 23:
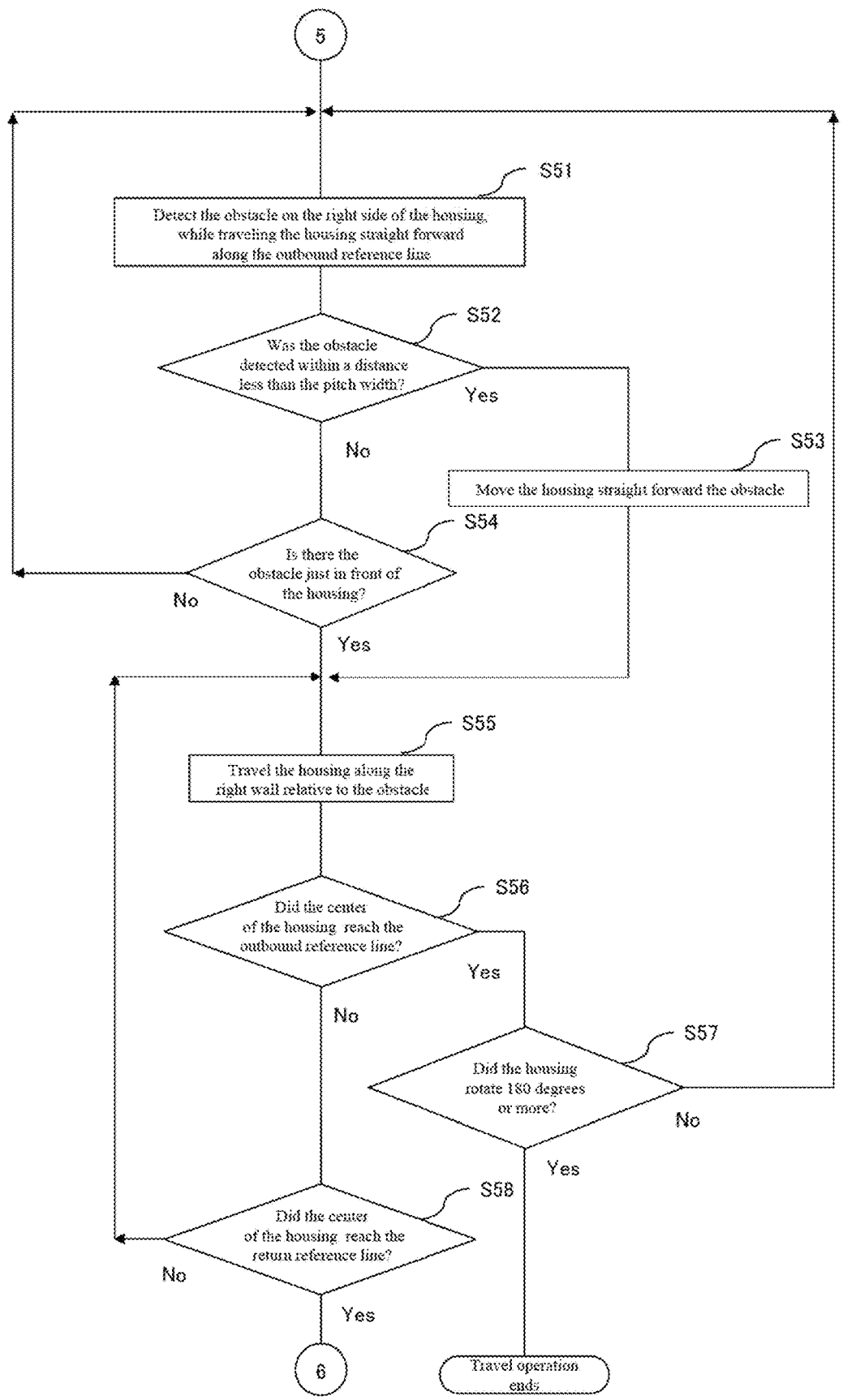
FIG. 23 is a flowchart showing a travel operation of the self-propelled vacuum cleaner according to the third embodiment of the present invention.

FIGS. 20 and 21 are explanatory views showing one example of the travel operation of the self-propelled vacuum cleaner 1 according to the first embodiment of the present invention. FIGS. 22 and 23 are flowcharts showing the travel operation of the self-propelled vacuum cleaner 1 according to the third embodiment. FIGS. 24 and 25 are explanatory views showing one example of the travel operation of the self-propelled vacuum cleaner 1 according to the third embodiment of the present invention.

As shown in FIG. 20, when the self-propelled vacuum cleaner 1 travels according to the travel operation procedure in the first embodiment in a state where an obstacle BL5 is provided on one side of the sidewall SW, the housing 2 travels along routes RT111 to RT117.

When doing so, the housing 2 travels in a zigzag manner based on the pitch width PW. Therefore, if a distance L3 between the housing 2 traveling straight forward along the return reference line HRL2 and the obstacle BL5 is less than the pitch width PW (that is, L3<PW), an untraveled area UTA4 (an area enclosed by a dash-dot line in FIG. 20) may be generated around the obstacle BL5.

Further, as shown in FIG. 21, when the self-propelled vacuum cleaner 1 travels according to the travel operation procedure in the first embodiment in a state where an obstacle BL6 is provided on one side of the sidewall SW, the housing 2 travels along routes RT121 to RT129 in FIG. 21.

When doing so, the housing 2 travels in a zigzag manner based on the pitch width PW. Therefore, if a distance L4 between the housing 2 traveling straight forward along the outbound reference line ORL3 and the obstacle BL6 is less than the pitch width PW (that is, L4<PW), an untraveled area UTA5 (an area enclosed by a dash-dot line in FIG. 21) may be generated around the obstacle BL6.

To address such a problem, the third embodiment describes the travel operation procedure of the self-propelled vacuum cleaner 1 that prevents the untraveled area UTA from being generated even when the obstacle BL is present at a position inconsistent with the pitch width PW during the zigzag travel of the housing 2.

Steps S41, S42, S44, and S46 to S50 in FIG. 22 respectively correspond to steps S21, S22, S24, and S26 to S30 in FIG. 16, and therefore, the description thereof will be omitted.

FIG. 22 is different from FIG. 16 in that, in step S43 in FIG. 22, the control section 40 causes the ultrasonic sensor 6 to detect an obstacle BL on the left side (in FIG. 16, on the right side) of the housing 2, while causing the housing 2 to move straight forward along the return reference line HRL, and in step S45, the control section 40 causes the housing 2 to move straight forward toward the obstacle BL.

Figure 24A:
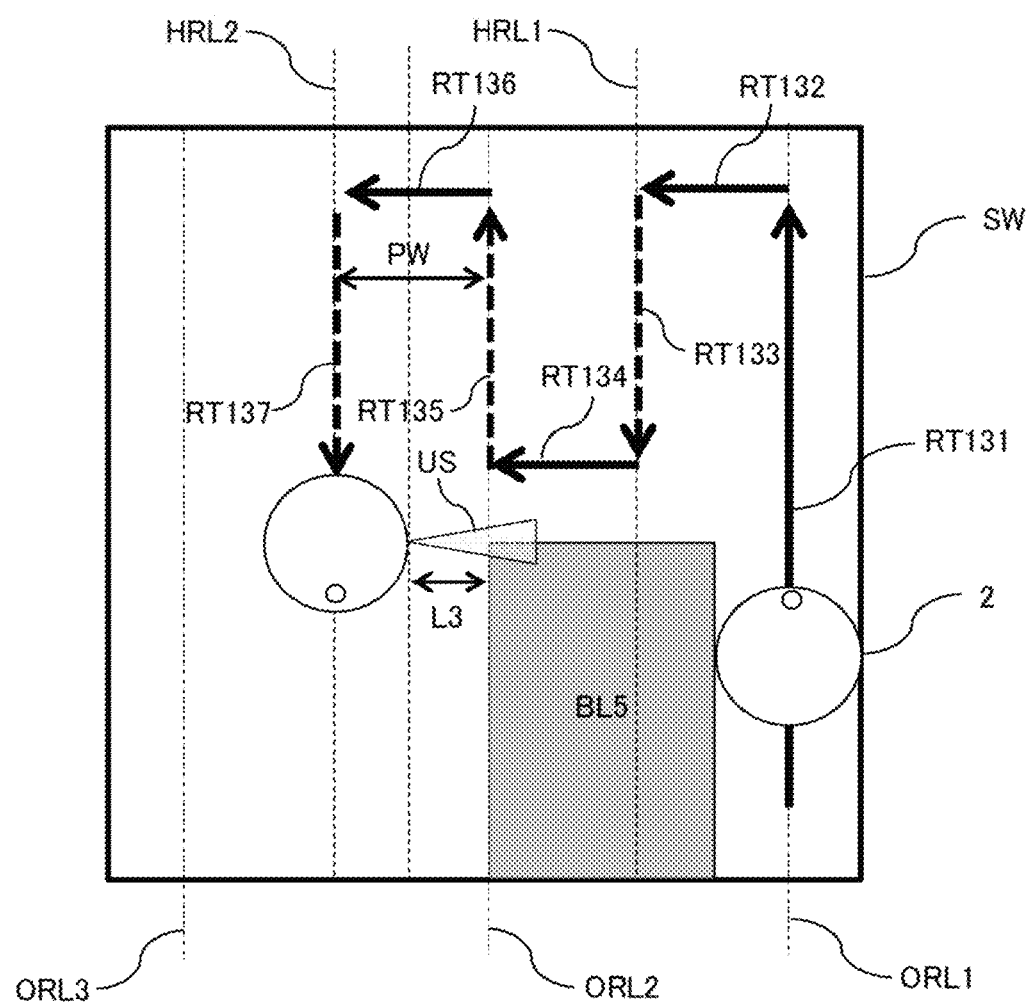
FIG. 24(A) is an explanatory view showing one example of the travel operation of the self-propelled vacuum cleaner according to the third embodiment of the present invention.
Figure 24B:
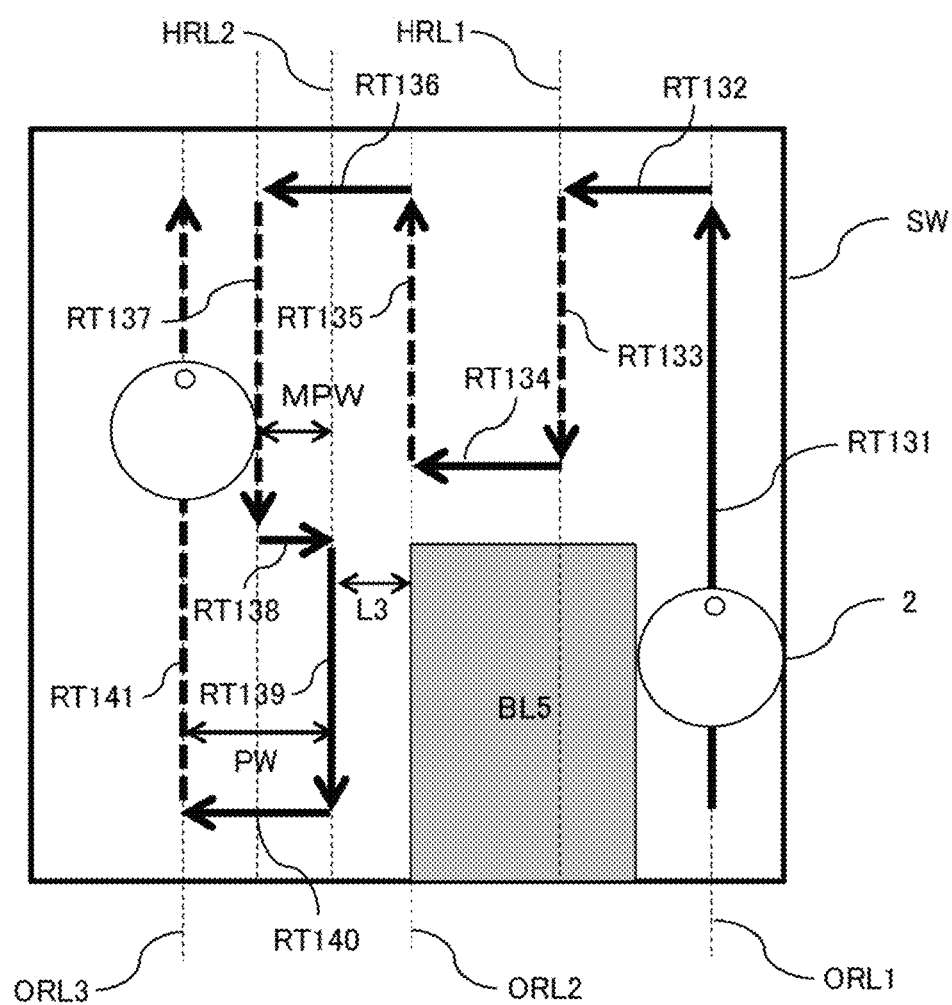
FIG. 24(B) is an explanatory view showing one example of the travel operation of the self-propelled vacuum cleaner according to the third embodiment of the present invention.

As shown in FIG. 24(A), when the housing 2 detects the obstacle BL5 on the left side of the housing 2 within the pitch width PW by the ultrasonic sensor 6 while moving straight forward along a route RT137 along the return reference line HRL2, the control section 40 causes the housing 2 to move straight forward along a route RT138 toward the obstacle BL5, and then, causes the housing 2 to travel along a route RT139 along the left wall relative to the obstacle BL5, as shown in FIG. 24(B).

Steps S52 and S54 to S58 in FIG. 23 respectively correspond to steps S32 and S34 to S38 in FIG. 17, and therefore, the description thereof will be omitted.

FIG. 23 is different from FIG. 17 in that, in step S51 in FIG. 23, the control section 40 causes the ultrasonic sensor 6 to detect an obstacle BL on the right side (in FIG. 17, on the left side) of the housing 2, while causing the housing 2 to move straight forward along the return reference line HRL, and in step S53, the control section 40 causes the housing 2 to move straight forward toward the obstacle BL.

Figure 25A:
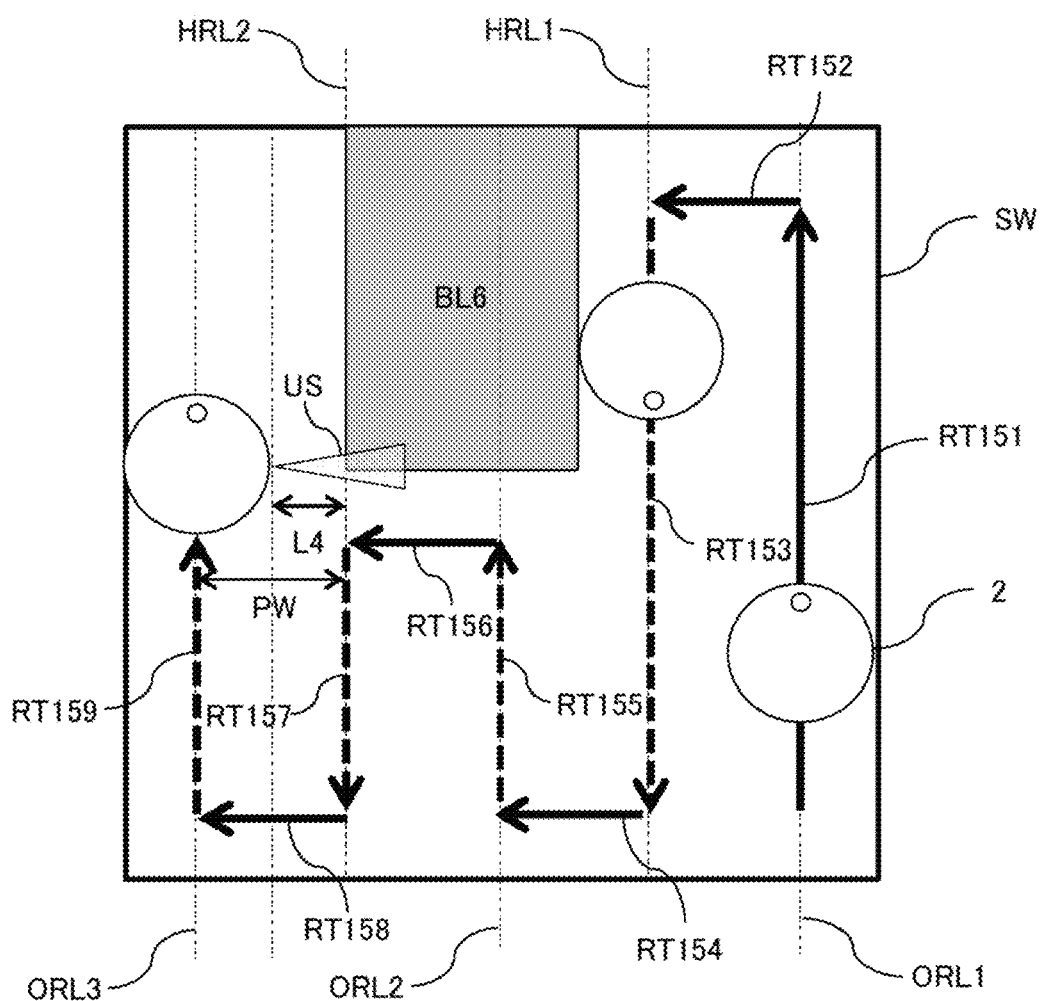
FIG. 25(A) is an explanatory view showing one example of the travel operation of the self-propelled vacuum cleaner according to the third embodiment of the present invention.
Figure 25B:
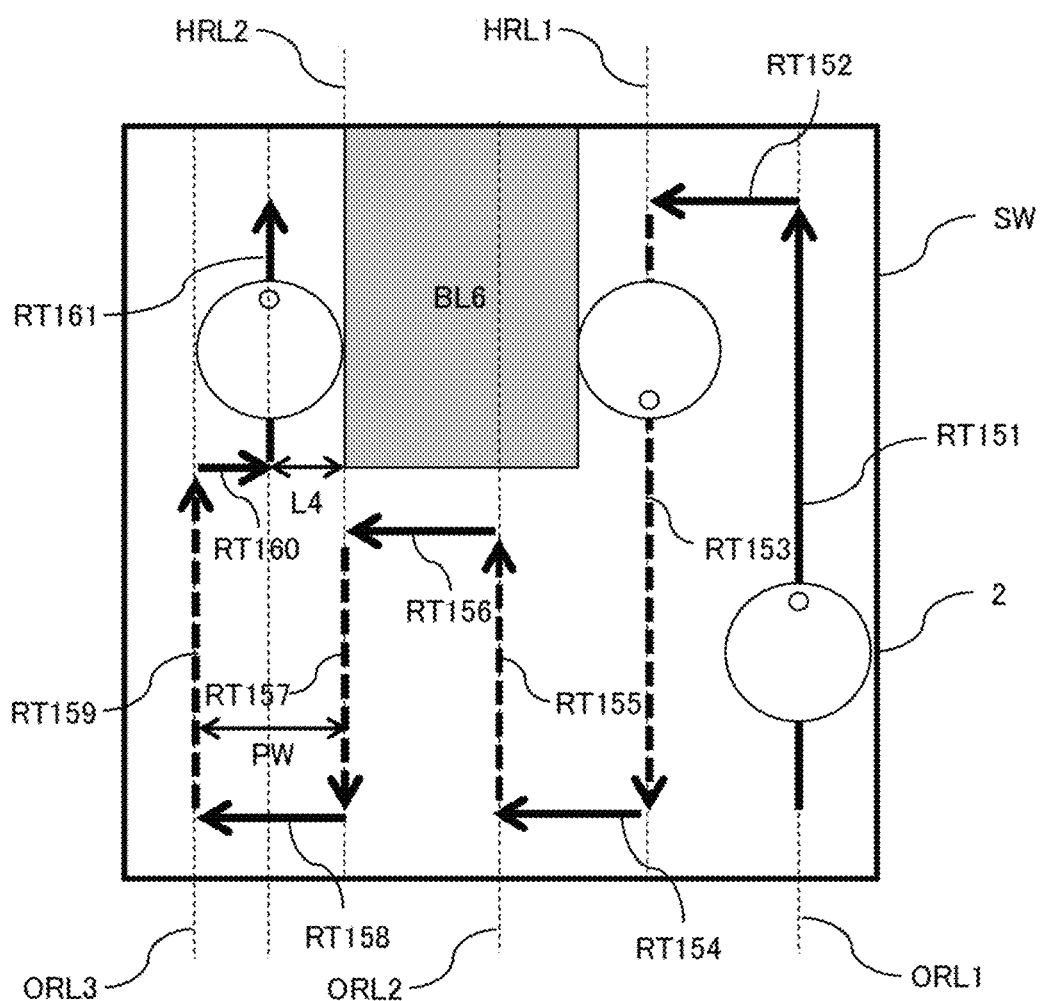
FIG. 25(B) is an explanatory view showing one example of the travel operation of the self-propelled vacuum cleaner according to the third embodiment of the present invention.

As shown in FIG. 25(A), when the housing 2 detects the obstacle BL6 on the right side of the housing 2 within the pitch width PW by the ultrasonic sensor 6 while moving straight forward along a route RT159 along the outbound reference line ORL3, the control section 40 causes the housing 2 to move straight forward along a route RT160 toward the obstacle BL6, and then, causes the housing 2 to travel along a route RT161 along the right wall relative to the obstacle BL6, as shown in FIG. 25(B).

In this way, even when there is an obstacle BL at a position inconsistent with the pitch width PW during the zigzag travel of the housing 2, the self-propelled vacuum cleaner 1 can travel everywhere in a room without generating the untraveled area UTA in a region after the housing 2 has passed by the obstacle BL.

Fourth Embodiment

<Travel Operation Procedure of Self-Propelled Vacuum Cleaner 1 According to Fourth Embodiment of the Present Invention>

Next, a travel operation procedure of a self-propelled vacuum cleaner 1 according to a fourth embodiment of the present invention will be described with reference to FIGS. 26 and 27.

Figure 26:
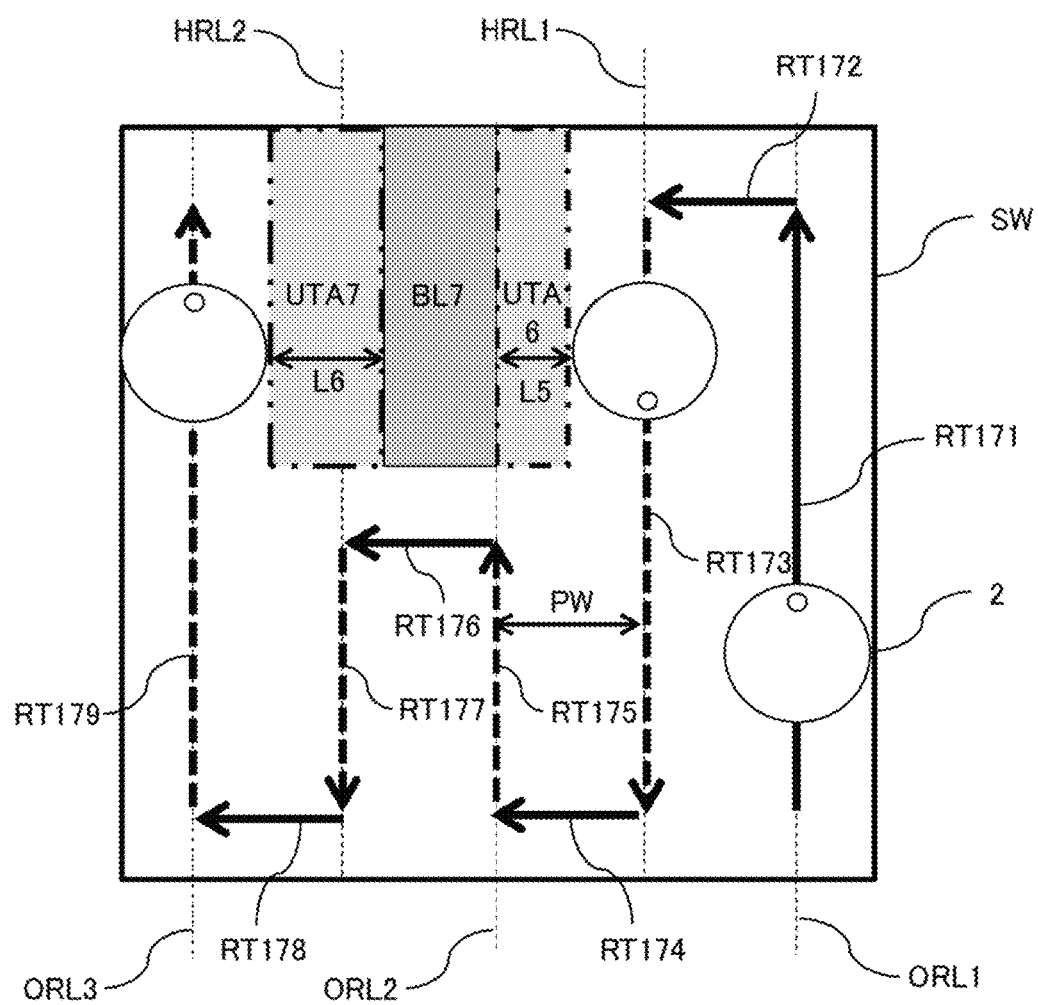
FIG. 26 is an explanatory view showing one example of the travel operation of the self-propelled vacuum cleaner according to the fourth embodiment of the present invention.
Figure 27:
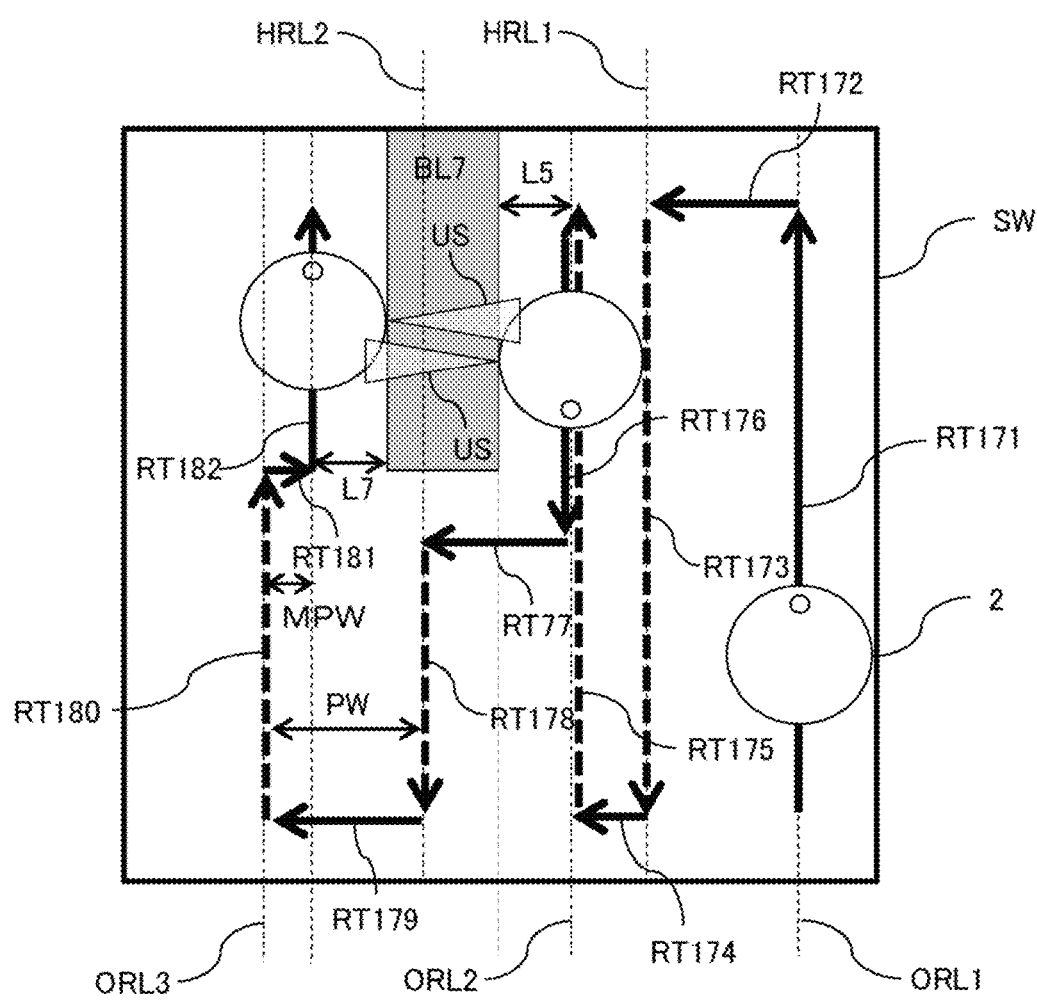
FIG. 27 is an explanatory view showing one example of a travel operation of a self propelled vacuum cleaner according to a fourth embodiment of the present invention.

FIGS. 26 and 27 are explanatory views showing one example of the travel operation of the self-propelled vacuum cleaner 1 according to the fourth embodiment of the present invention.

As shown in FIG. 26, when the self-propelled vacuum cleaner 1 travels according to the travel operation procedure in the first embodiment in a state where an obstacle BL7 is provided on one side of the sidewall SW, the housing 2 travels along routes RT171 to RT179.

When doing so, the housing 2 travels in a zigzag manner based on the pitch width PW. Therefore, if a distance L5 between the housing 2 traveling straight forward along the return reference line HRL1 and the obstacle BL7 is less than the pitch width PW (that is, L5<PW), an untraveled area UTA6 (an area enclosed by a dash-dot line in FIG. 26) may be generated around the obstacle BL7.

Further, if a distance L6 between the housing 2 traveling straight forward along the outbound reference line ORL3 and the obstacle BL7 is less than the pitch width PW (that is, L6<PW), an untraveled area UTA7 (an area enclosed by a chain double-dashed line in FIG. 26) may be generated around the obstacle BL7.

To address such a problem, a travel operation procedure obtained by combining the travel operation procedure in the second embodiment and the travel operation procedure in the third embodiment may be performed.

According to this configuration, even when the distances between both sides of the obstacle BL7 and the housing 2 are inconsistent with the pitch width PW during the zigzag travel of the housing 2, the self-propelled vacuum cleaner 1 can travel everywhere in a room without generating the untraveled area UTA, as shown in FIG. 27.

Fifth Embodiment

In the first to fourth embodiments, when detecting two or more obstacles BL during the travel of the housing 2, the control section 40 may determine a pitch width PW to the next outbound reference line ORL or the return reference line HRL based on the distance L between the housing 2 and the obstacle BL located closest to the housing 2.

According to this configuration, even when there are two or more obstacles BL at positions inconsistent with the pitch width PW during the zigzag travel of the housing 2, the self-propelled vacuum cleaner 1 can travel everywhere in a room, while minimizing the generation of the untraveled area UTA with the housing 2 being prevented from getting caught by the obstacle BL during traveling.

Figure 28A:
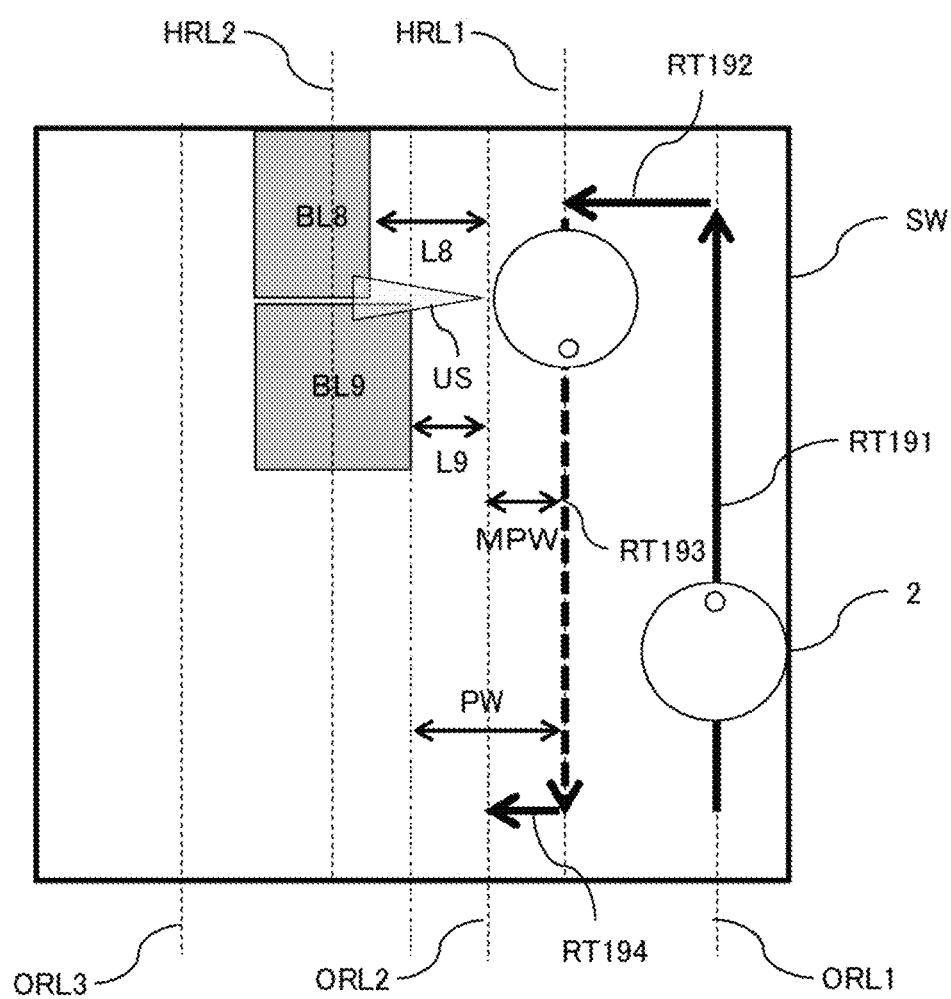
FIG. 28(A) is an explanatory view showing one example of a travel operation of a self-propelled vacuum cleaner according to a fifth embodiment of the present invention.

For example, when detecting two obstacles BL8 and BL9 having different widths while the housing 2 is moving straight forward along a route RT193 along the return reference line HRL1, the control section 40 employs the distance L9 to the obstacle BL9 that is shorter than the distance L8 to the obstacle BL8, as shown in FIG. 28(A).

In this case, the modified pitch width MPW to the next outbound reference line ORL2 becomes PW−L9 obtained by subtracting the distance L9 from the predetermined default pitch width PW.

Figure 28B:
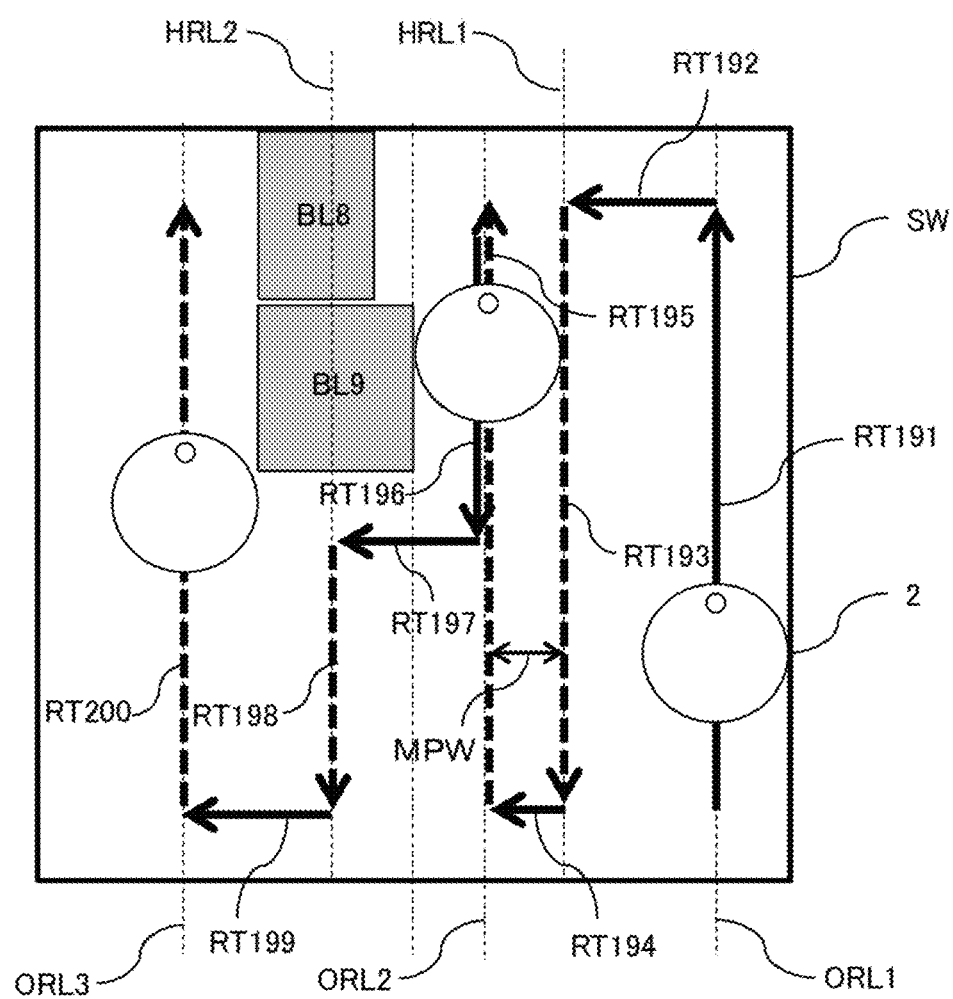
FIG. 28(B) is an explanatory view showing one example of the travel operation of the sell propelled vacuum cleaner according to the fifth embodiment of the present invention.

Thus, the housing 2 can move straight along a route RT195 along the outbound reference line ORL2 without being caught by the wider obstacle BL9 as shown in FIG. 28(B).

As described above, (i) The self-propelled electronic device according to the present invention comprises: a housing; drive wheels that enable the housing to travel; a travel control unit that controls travel of the housing; an obstacle sensor that detects an obstacle present at least in front of, on a left side, and on a right side of the housing; and a housing direction detection unit that detects an orientation of the housing, wherein:

when the housing travels in a closed region surrounded by an obstacle, the travel control unit causes the housing to travel back and forth along a route formed such that an outbound path and a return path which are linear are alternately connected;

when the obstacle sensor detects an obstacle ahead while the housing is moving straight forward along the outbound path, the travel control unit causes the housing to travel along the obstacle such that the obstacle is located on a predetermined side of the housing, which is either a left side or a right side of the housing, whereas, when the obstacle sensor detects an obstacle ahead while the housing is moving straight forward along the return path, the travel control unit causes the housing to travel along the obstacle such that the obstacle is located on an opposite side of the predetermined side; and when the housing advances by a predetermined pitch width in a direction orthogonal to a back-and-forth direction during traveling along the obstacle, the travel control unit changes a direction of the housing and causes the housing to move straight forward along a next return path or outbound path, whereas, when the housing again returns to the outbound path or return path along which the housing has traveled before the detection of the obstacle during traveling along the obstacle, the housing direction detection unit detects whether an orientation of the housing is reversed or not based on an orientation of the housing when the housing has traveled along the outbound path or the return path before the detection of the obstacle, wherein, when the orientation of the housing is reversed, the travel control unit ends traveling of the housing, and when the orientation of the housing is not reversed, the travel control unit causes the housing to continue to move straight forward along the outbound path or the return path.

The travel method for a self-propelled electronic device according to the present invention is characterized in that: when a housing provided with drive wheels travels in a closed region surrounded by an obstacle, the housing travels back and forth along a route formed such that an outbound path and a return path which are linear are alternately connected;

when an obstacle is detected ahead while the housing is moving straight forward along the outbound path, the housing travels along the obstacle such that the obstacle is located on a predetermined side of the housing, which is either a left side or a right side of the housing, whereas, when an obstacle is detected ahead while the housing is moving straight forward along the return path, the housing travels along the obstacle such that the obstacle is located on an opposite side of the predetermined side; and when the housing advances by a predetermined pitch width in a direction orthogonal to a back-and-forth direction of the housing during traveling along the obstacle, the housing changes its direction and moves straight forward along a next outbound path or return path, whereas, when the housing again returns to the outbound path or return path along which the housing has traveled before the detection of the obstacle during traveling along the obstacle, whether an orientation of the housing is reversed or not is determined based on an orientation of the housing when the housing has traveled along the outbound path or the return path before the detection of the obstacle, wherein, when the orientation of the housing is reversed, traveling of the housing is ended, and when the orientation of the housing is not reversed, the housing keeps on moving straight forward along the outbound path or the return path.

In the present invention, the "self-propelled electronic device" executes an operation such as a cleaning operation, an air purification operation, and an ion generating operation, while traveling. One example of a specific mode of the self-propelled electronic device is a self-propelled vacuum cleaner. The self-propelled vacuum cleaner means a vacuum cleaner which autonomously performs a cleaning operation and is provided with a housing having a dust-collecting unit inside and a suction opening on a bottom surface, drive wheels for causing the housing to travel, a control unit for controlling the rotation, stop, and the rotational direction of the drive wheels, and the like. One example of the self-propelled vacuum cleaner is shown in the embodiments described above with reference to the drawings.

In addition, the self-propelled electronic device according to the present invention includes not only the self-propelled vacuum cleaner but also, for example, a self-propelled air purifier that suctions air and discharges purified air, a self-propelled ion generator that generates ions, a device that presents information or the like necessary for a user, and a self-propelled robot that can meet the requirement of the user.

The wording "to cause the housing to travel back and forth along a route formed such that an outbound path and a return path which are linear are alternately connected" means that, in a case where the self-propelled electronic device travels around a room surrounded by a sidewall on all four sides, for example, the device moves straight forward along an outbound path along a right sidewall of the room, and then, rotates 90 degrees in a counterclockwise direction and moves along a route along the front sidewall by a predetermined pitch width. Thereafter, the device further rotates 90 degrees in the counterclockwise direction, and moves straight forward along the return path, and then, rotates 90 degrees in the clockwise direction, and moves along a route along the rear sidewall by the predetermined pitch width. Thereafter, the device further rotates 90 degrees in the clockwise direction, and moves straight forward along the outbound path. In this way, the device alternately moves along the outbound path and the return path by the predetermined pitch in a zigzag manner up to the left sidewall. The wording means such a zigzag travel operation.

If the "closed region surrounded by an obstacle" is not a square or a rectangular, and the self-propelled electronic device travels around a trapezoidal region, the housing moves straight forward along a route along an inclined wall of the trapezoid, and then, travels in a direction parallel to the bottom surface of the trapezoid by a predetermined pitch width. Thereafter, the device changes its direction, and moves straight forward along a return path perpendicular to the bottom surface of the trapezoid. In this case, the angle of change in direction is not limited to 90 degrees, and may vary depending on the inclination angle of the closed region.

The wording "the travel control unit causes the housing to travel along the obstacle such that the obstacle is located on a predetermined side of the housing, which is either a left side or a right side of the housing" and "the travel control unit causes the housing to travel along the obstacle such that the obstacle is located on an opposite side of the predetermined side" means that, when causing the housing to travel along a right wall on the outbound path, the travel control unit causes the housing to travel along a left wall on the return path, and when causing the housing to travel along the left wall on the outbound path, the travel control unit causes the housing to travel along the right wall on the return path.

In addition, the travel control unit may determine a predetermined side according to a condition upon the start of the zigzag travel. For example, when the housing starts the zigzag travel with a wall being detected on the right side (or left side) upon starting the zigzag travel, the travel control unit causes the housing to travel along the right wall (or left wall) on the outbound path and causes the housing to travel along the left wall (or right wall) on the return path.

Further, the wording "reversed" in "whether the orientation of the housing is reversed" means that the housing rotates about 180 degrees or more, and a range of application may be set for each device, such as within a range of 170 degrees to 180 degrees or more.

Preferable modes of the present invention will further be described.

(ii) The self-propelled electronic device according to the present invention may be configured such that, when the obstacle sensor detects an obstacle on an opposite side of the predetermined side while the housing is moving straight forward along the outbound path and a distance to the obstacle is less than the pitch width, or when the obstacle sensor detects an obstacle on the predetermined side while the housing is moving straight forward along the return path and a distance to the obstacle is less than the pitch width, the travel control unit determines a length obtained by subtracting the distance from the pitch width as a modified pitch width, and when the obstacle sensor then detects an obstacle ahead while the housing is moving straight forward along the outbound path or the return path and, during traveling along the obstacle, the housing advances in a direction orthogonal to the back-and-forth direction of the housing by the modified pitch width, the travel control unit changes the direction of the housing, and causes the housing to move straight forward along a next outbound path or return path.

This configuration can implement a self-propelled electronic device that can travel everywhere in a room, even when there is an obstacle at a position inconsistent with the pitch width of the zigzag travel of the housing, without generating an untraveled region in a region before the device is in contact with the obstacle.

(iii) The self-propelled electronic device according to the present invention may be configured such that, when the obstacle sensor detects two or more obstacles on the opposite side of the predetermined side while the housing is moving straight forward along the outbound path and distances to the two or more obstacles are less than the pitch width, or when the obstacle sensor detects two or more obstacles on the predetermined side while the housing is moving straight forward along the return path and distances to the two or more obstacles are less than the pitch width, the travel control unit determines a length obtained by subtracting a distance to the obstacle closest to the housing from the pitch width as the modified pitch width.

This configuration can implement a self-propelled electronic device that can travel everywhere in a room, even when there are two or more obstacles at positions inconsistent with the pitch width of the zigzag travel of the housing, without causing the housing to be caught by the obstacles, while minimizing an untraveled region.

Note that, if there are two or more "obstacles which are closest to the housing", any of the distances from the obstacles to the housing may be employed.

(iv) The self-propelled electronic device according to the present invention may be configured such that, when the obstacle sensor detects an obstacle on the predetermined side while the housing is moving straight forward along the outbound path and a distance to the obstacle is less than the pitch width, the travel control unit causes the housing to move straight forward toward the obstacle, and then, causes the housing to travel along the obstacle such that the obstacle is located on the predetermined side, whereas, when the obstacle sensor detects an obstacle on the opposite side of the predetermined side while the housing is moving straight forward along the return path and a distance to the obstacle is less than the pitch width, the travel control unit causes the housing to move straight forward toward the obstacle, and then, causes the housing to travel along the obstacle such that the obstacle is located on the opposite side of the predetermined side.

This configuration can implement a self-propelled electronic device that can travel everywhere in a room, even when there is an obstacle at a position inconsistent with the pitch width of the zigzag travel of the housing, without generating an untraveled region in a region after the device has passed by the obstacle.

The preferable modes of the present invention also include modes obtained by combining some of the above-mentioned modes.

Besides the embodiments described above, various modifications are possible for the present invention. These modifications should not be deemed to be out of the scope of the present invention. The present invention should include all the modifications within the scope of the claims, their equivalents, and within the above scope.

DESCRIPTION OF REFERENCE SIGNS

1 Self-propelled vacuum cleaner
2 Housing
2a Bottom plate
$2a_2$ Opening $2a_4$ Support member
$2b$ Top plate
$2c$ Side plate
$2c_1$ Bumper
$2c_2$ Rear side plate
$2d$ Support plate
$2s_1$ Intermediate space
$2s_2$ Rear space
$2x$ Housing main body
$2x_1$ Front opening
6 Ultrasonic sensor
6*a* Control unit
$6b_1$ Ultrasonic wave transmitting unit
$6b_2$ Ultrasonic wave receiving unit
9 Rotary brush
10 Side brush
13 Charging terminal
15 Dust-collecting chamber
15*a* Dust-collecting box
$15a_1$ Suction opening
$15a_2$ Discharge opening
15*b* Filter
15*c* Cover
18, 18FL, 18FR Floor surface detection sensor
18*a* Control unit
22L Left drive wheel
22R Right drive wheel
26 Rear wheel
31 Suction opening
32 Exhaust opening
34 Exhaust path
40 Control section
41 Operation panel
42 Storage unit
42*a* Travel map
43 Collision detection unit
43*a* Control unit
43*b* Moving object detection unit
44*a* Control unit
44*b* Housing direction detection sensor
50 Electrically powered fan
50*a*, 51*a*, 52*a* Motor driver
51 Travel motor
52 Brush motor
114 Duct
120 Ion generator
A, B Arrow
BL, BL1 to BL9 Obstacle
HRL, HRL1, HRL2 Return reference line
L, L0 to L9 Distance
ORL, ORL1 to ORL3 Outbound reference line
MPW Modified pitch width
PW Pitch width
RT, RT1 to RT200 Route
SW Sidewall
UL Drive wheel unit
UR Drive wheel unit
US Ultrasonic signal
UTA, UTA1 to UTA7 Untraveled region

What is claimed is:

1. A self-propelled electronic device comprising: a housing; drive wheels that enable the housing to travel; a travel control unit that controls travel of the housing; an obstacle sensor that detects an obstacle present at least in front of, on a left side, and on a right side of the housing; and a housing direction detection unit that detects an orientation of the housing, wherein:

when the housing travels in a closed region surrounded by an obstacle, the travel control unit causes the housing to travel back and forth along a route formed such that an outbound path and a return path which are linear are alternately connected;

when the obstacle sensor detects an obstacle ahead while the housing is moving straight forward along the outbound path, the travel control unit causes the housing to travel along the obstacle such that the obstacle is located on a predetermined side of the housing, which is either a left side or a right side of the housing, whereas, when the obstacle sensor detects an obstacle ahead while the housing is moving straight forward along the return path, the travel control unit causes the housing to travel along the obstacle such that the obstacle is located on an opposite side of the predetermined side; and when the housing advances by a predetermined pitch width in a direction orthogonal to a back-and-forth direction during traveling along the obstacle, the travel control unit changes a direction of the housing and causes the housing to move straight forward along a next return path or outbound path, whereas, when the housing again returns to the outbound path or return path along which the housing has traveled before the detection of the obstacle during traveling along the obstacle, the housing direction detection unit detects whether an orientation of the housing is reversed or not based on an orientation of the housing when the housing has traveled along the outbound path or the return path before the detection of the obstacle, wherein, when the orientation of the housing is reversed, the travel control unit ends traveling of the housing, and when the orientation of the housing is not reversed, the travel control unit causes the housing to continue to move straight forward along the outbound path or the return path.

2. The self-propelled electronic device according to claim 1, when the obstacle sensor detects an obstacle on an opposite side of the predetermined side while the housing is moving straight forward along the outbound path and a distance to the obstacle is less than the pitch width, or when the obstacle sensor detects an obstacle on the predetermined side while the housing is moving straight forward along the return path and a distance to the obstacle is less than the pitch width, the travel control unit determines a length obtained by subtracting the distance from the pitch width as a modified pitch width, and when the obstacle sensor then detects an obstacle ahead while the housing is moving straight forward along the outbound path or the return path and, during traveling along the obstacle, the housing advances in a direction orthogonal to the back-and-forth direction of the housing by the modified pitch width, the travel control unit changes the direction of the housing, and causes the housing to move straight forward along a next outbound path or return path.

3. The self-propelled electronic device according to claim 2, when the obstacle sensor detects two or more obstacles on the opposite side of the predetermined side while the housing is moving straight forward along the outbound path and distances to the two or more obstacles are less than the pitch width, or when the obstacle sensor detects two or more obstacles on the predetermined side while the housing is moving straight forward along the return path and distances to the two or more obstacles are less than the pitch width, the travel control unit determines a length obtained by subtracting a distance to the obstacle closest to the housing from the pitch width as the modified pitch width.

4. The self-propelled electronic device according to any of claims 1 to 3, when the obstacle sensor detects an obstacle on the predetermined side while the housing is moving straight forward along the outbound path and a distance to the obstacle is less than the pitch width, the travel control unit causes the housing to move straight forward toward the obstacle, and then, causes the housing to travel along the obstacle such that the obstacle is located on the predetermined side, whereas, when the obstacle sensor detects an obstacle on the opposite side of the predetermined side while the housing is moving straight forward along the return path and a distance to the obstacle is less than the pitch width, the travel control unit causes the housing to move straight forward toward the obstacle, and then, causes the housing to travel along the obstacle such that the obstacle is located on the opposite side of the predetermined side.

5. A travel method for a self-propelled electronic device wherein: when a housing provided with drive wheels travels in a closed region surrounded by an obstacle, the housing travels back and forth along a route formed such that an outbound path and a return path which are linear are alternately connected;

when an obstacle is detected ahead while the housing is moving straight forward along the outbound path, the housing travels along the obstacle such that the obstacle is located on a predetermined side of the housing, which is either a left side or a right side of the housing, whereas, when an obstacle is detected ahead while the housing is moving straight forward along the return path, the housing travels along the obstacle such that the obstacle is located on an opposite side of the predetermined side; and when the housing advances by a predetermined pitch width in a direction orthogonal to a back-and-forth direction of the housing during traveling along the obstacle, the housing changes its direction and moves straight forward along a next outbound path or return path, whereas, when the housing again returns to the outbound path or return path along which the housing has traveled before the detection of the obstacle during traveling along the obstacle, whether an orientation of the housing is reversed or not is determined based on an orientation of the housing when the housing has traveled along the outbound path or the return path before the detection of the obstacle, wherein, when the orientation of the housing is reversed, traveling of the housing is ended, and when the orientation of the housing is not reversed, the housing keeps on moving straight forward along the outbound path or the return path.

* * * * *